(12) United States Patent
Aoki

(10) Patent No.: US 9,858,468 B2
(45) Date of Patent: Jan. 2, 2018

(54) IMAGE PROCESSING DEVICE AND IMAGE PROCESSING METHOD

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 29 days.

(21) Appl. No.: 15/051,937

(22) Filed: Feb. 24, 2016

(65) Prior Publication Data

US 2016/0267316 A1 Sep. 15, 2016

(30) Foreign Application Priority Data

Mar. 13, 2015 (JP) ................ 2015-050856

(51) Int. Cl.
| | | |
|---|---|---|
| G06K 9/00 | (2006.01) | |
| G06K 9/46 | (2006.01) | |
| G06K 9/52 | (2006.01) | |
| G06T 5/00 | (2006.01) | |
| G06T 7/60 | (2017.01) | |
| G06T 7/73 | (2017.01) | |

(52) U.S. Cl.
CPC ..... *G06K 9/00087* (2013.01); *G06K 9/00033* (2013.01); *G06K 9/00067* (2013.01); *G06K 9/00382* (2013.01); *G06K 9/00912* (2013.01); *G06K 9/4661* (2013.01); *G06K 9/52* (2013.01); *G06T 5/00* (2013.01); *G06T 7/60* (2013.01); *G06T 7/74* (2017.01); *G06K 2009/00932* (2013.01)

(58) Field of Classification Search
CPC .. G06K 9/52; G06K 9/00033; G06K 9/00067; G06K 9/00087; G06K 9/00382; G06K 9/00912; G06K 9/4661; G06T 7/74
USPC .......................... 382/115–124, 218
See application file for complete search history.

(56) References Cited

U.S. PATENT DOCUMENTS

| | | | | |
|---|---|---|---|---|
| 8,692,875 B2 * | 4/2014 | Watanabe | .......... | G06K 9/00033 340/5.83 |
| 2016/0180142 A1 * | 6/2016 | Riddle | ............... | G06K 9/00033 382/124 |

FOREIGN PATENT DOCUMENTS

| | | |
|---|---|---|
| EP | 1903509 A1 | 3/2008 |
| EP | 2410486 A1 | 1/2012 |
| JP | 04-096186 | 3/1992 |

OTHER PUBLICATIONS

Extended European Search Report dated Aug. 8, 2016 for corresponding European Patent Application No. 16156661.7, 9 pages.
(Continued)

*Primary Examiner* — Daniel Mariam
(74) *Attorney, Agent, or Firm* — Fujitsu Patent Center

(57) ABSTRACT

A processor estimates a shape of a subject on the basis of an image of the subject, and a memory stores the shape of the subject. The processor generates a quadratic surface connecting a plurality of points on the subject on the basis of the shape of the subject, and develops each of the plurality of points to a planar surface contacting the quadratic surface. Thereafter the processor corrects the image of the subject on the basis of a position of each of the plurality of points developed to the planar surface.

14 Claims, 26 Drawing Sheets

(56) References Cited

OTHER PUBLICATIONS

Smith, William A.P. et al., "Recovering Facial Shape Using a Statistical Model of Surface Normal Direction", IEEE Transactions on Pattern Analysis and Machine Intelligence, IEEE Computer Society, USA, vol. 28, No. 12, Dec. 1, 2006, pp. 1914-1930.
R. Kimmel et al., "Global Shape from Shading", CVGIP: Image Understanding, 1994 IEEE, pp. 120-125 (6 pages).
R. Zhang et al., "Shape from Shading: A Survey", IEEE Transactions on Pattern Analysis and Machine Intelligence, vol. 21, No. 8, Aug. 1999, pp. 690-706 (17 pages).
E. Prados et al., "Shape from Shading: a well-posed problem?", INRIA, No. 5297, Aug. 2004, pp. 1-55 (58 pages).

\* cited by examiner

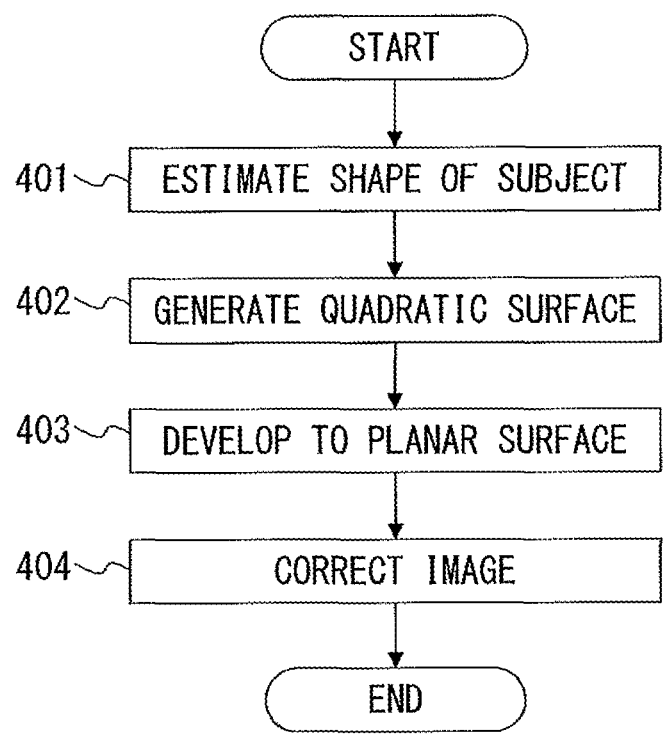
F I G. 4

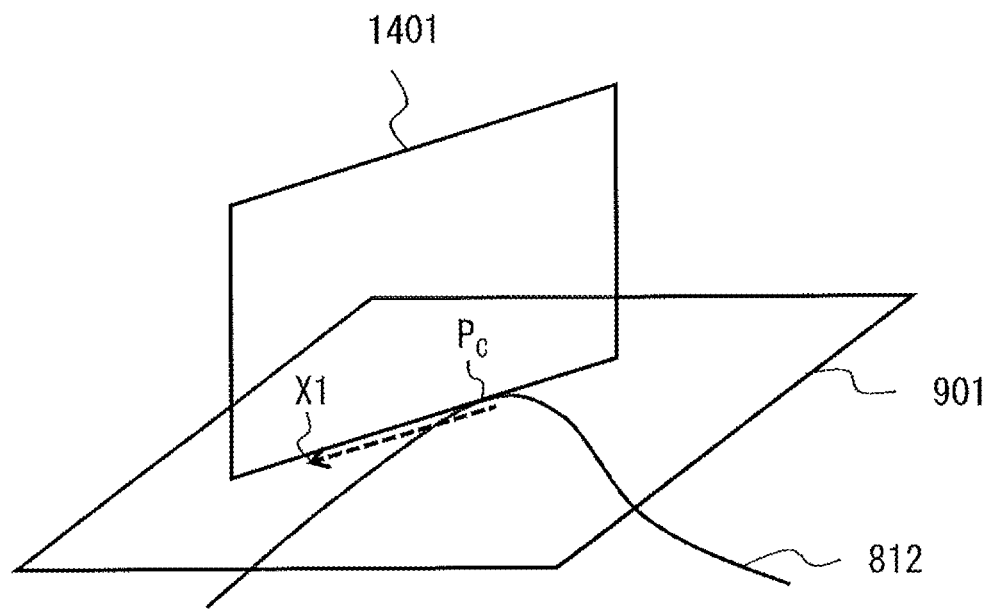
F I G. 1 4

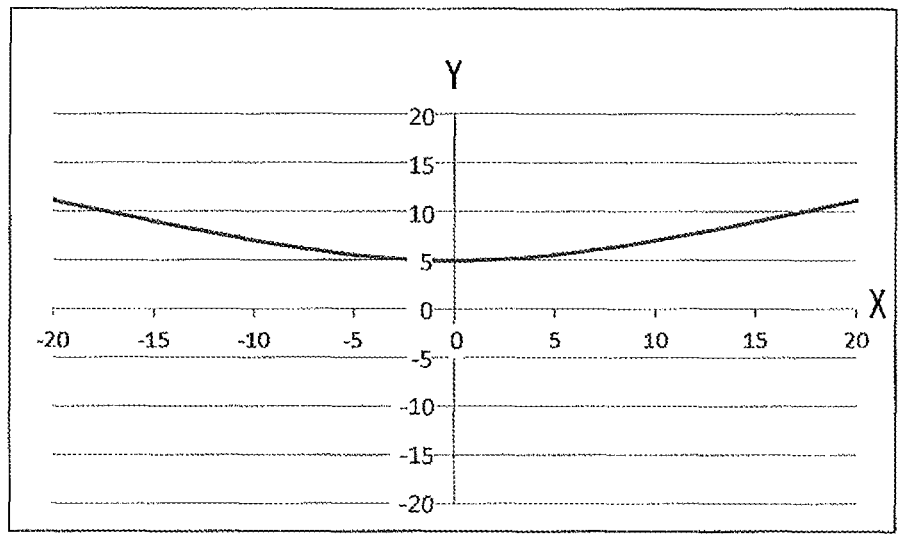
F I G. 1 8

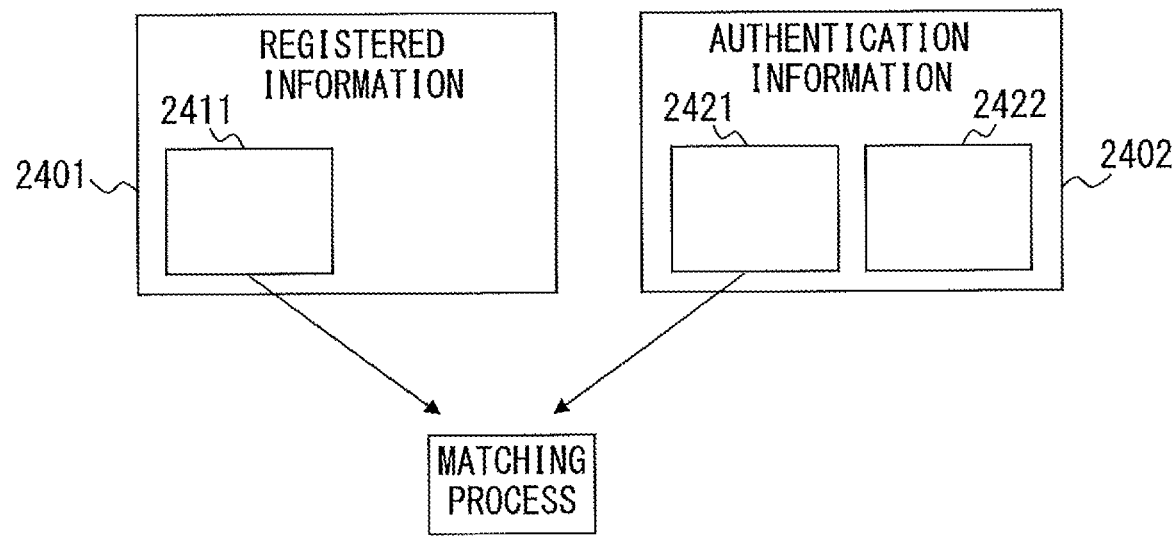
F I G. 2 5

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2015-050856, filed on Mar. 13, 2015, the entire contents of which are incorporated herein by reference.

FIELD

The embodiments discussed herein are related to an image processing device and an image processing method.

BACKGROUND

Palm vein authentication is biometric authentication technology by which the vein pattern of a palm is photographed by using near infrared rays so as to authenticate an individual on the basis of the vein pattern. When a vein pattern is registered, the posture of the hand, which is the subject, can be corrected by using a guide, whereas when matching is conducted for the vein pattern, a guide is often unavailable. In such a case, a posture difference in the hand between when it is used for registration and when it is used for matching results in a larger difference between the registered data and the matching data, decreasing the success rate in authenticating the person who is eligible to be authenticated.

In view of this, it is conceivable to measure the posture of a hand such as the inclination, the rotation, etc. of the palm so as to correct the image of the palm photographed for the matching in such a manner that the posture difference in the hand between the registration and the matching are cancelled. Normalizing images by using this method increases the success rate in authenticating the person who is eligible to be authenticated.

Shape From Shading (SFS) technology is also known in which the three-dimensional shape of a subject is estimated on the basis of the brightness distribution in a subject image picked up with illumination light cast on the subject (For example, non Patent Documents 1 through 3).

A fundamental pattern mapping method is also known in which a two-dimensional texture with a fundamental pattern is mapped on an adjustable curved surface made of a three-dimensional curved surface so as to create repeatedly a fundamental pattern on the adjustable curved surface (For example, Patent Document 1).

Patent Document 1: Japanese Laid-open Patent Publication No. 04-96186

Non Patent Document 1: R. Kimmel et al., "Global Shape from Shading", CVGIP: Image Understanding, pp. 120-125, 1994

Non Patent Document 2: R. Zhang et al., "Shape from Shading: A Survey", IEEE PAMI (Transactions on Pattern Analysis and Machine Intelligence), Vol. 21, No. 8, pp. 690-706, August 1999

Non Patent Document 3: E. Prados et al., "Shape from Shading: a well-posed problem?", INRIA, No. 5297, pp. 1-55, August 2004

SUMMARY

According to an aspect of the embodiments, an image processing device includes a processor and a memory.

The processor estimates the shape of a subject on the basis of an image of the subject, and the memory stores the shape of the subject. The processor generates a quadratic surface connecting a plurality of points on the subject on the basis of the shape of the subject, develops each of the plurality of points to a planar surface contacting the quadratic surface. Thereafter, the processor corrects the image of the subject on the basis of the position of each of the plurality of points developed to the planar surface.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a flowchart for an image process;
FIG. 14 illustrates a sectional planar surface;
FIG. 18 illustrates a hyperbola;
FIG. 25 illustrates a biometric authentication process that does not use development information.

DESCRIPTION OF EMBODIMENTS

Figure 1:
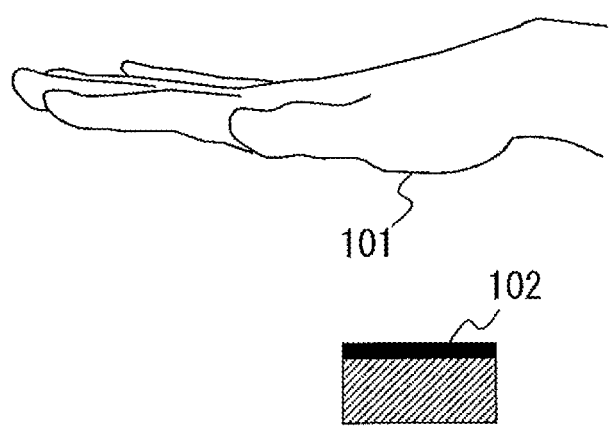
FIG. 1 illustrates a vein sensor.

Hereinafter, detailed explanations will be given for the embodiments by referring to the drawings.

FIG. 1 illustrates an example of a vein sensor that photographs a vein pattern of a palm. In order to photograph a vein pattern appropriately, it is desired that a palm 101, which is the subject, is parallel to a vein sensor 102. When the palm 101 is inclined with respect to the vein sensor 102, the difference in the vein pattern caused by the inclination can be corrected by applying the SFS technology to the reflection light of near infrared rays and measuring the inclination of the palm 101.

Figure 2:
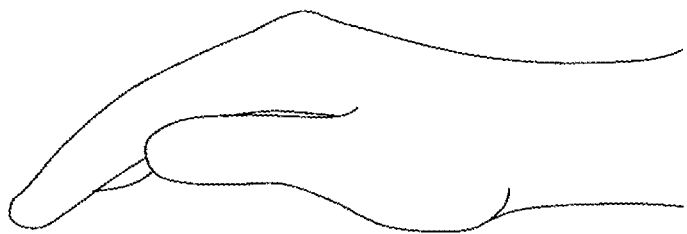
FIG. 2 illustrates a bent palm.

However, when the palm is bent as illustrated in FIG. 2 or is opened excessively at the registration or matching of the vein pattern, the difference in the vein pattern caused by distortion of the three-dimensional shape of the palm is likely to remain. This may make it difficult to authenticate a person who is eligible to be authenticated. In view of this, it is desired that differences in vein pattern be corrected highly accurately by treating the palm as a curved surface instead of a planar surface.

Note that the above problem occurs not only in the case of palm vein authentication but also in a case where an image of other types of subject obtained by using illumination light that is not near infrared rays is corrected.

Figure 3:
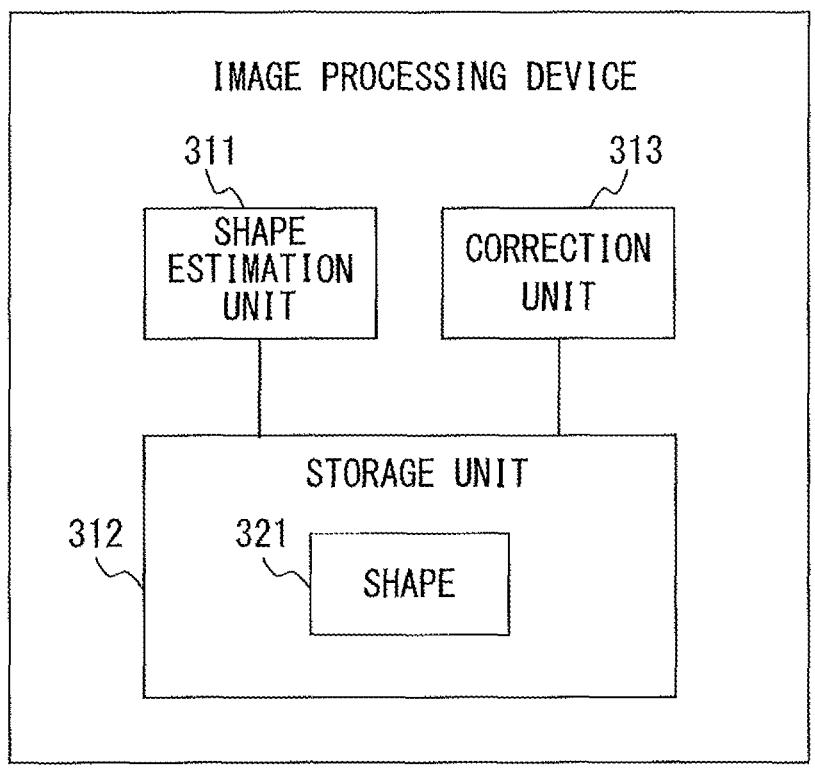
FIG. 3 illustrates a functional configuration of an image processing device.

FIG. 3 illustrates a functional configuration example of an image processing device according to an embodiment. An image processing device 301 includes a shape estimation unit 311, a storage unit 312 and a correction unit 313.

FIG. 4 is a flowchart explaining an example of an image process performed by the image processing device 301 illustrated in FIG. 3. The shape estimation unit 311 estimates a shape 321 of the subject on the basis of an image of the subject, while the storage unit 312 stores the shape 321 of the subject (step 401).

On the basis of the shape 321, the correction unit 313 generates a quadratic surface that connects a plurality of points on the subject (step 402), and develops each of the plurality of points to a planar surface that contacts the quadratic surface (step 403). Then, the correction unit 313 corrects an image of the subject on the basis of the position of each of the points developed to the planar surface (step 404).

The image processing device 301 illustrated in FIG. 3 makes it possible to normalize accurately an image of a subject whose shape is distorted.

Figure 5:
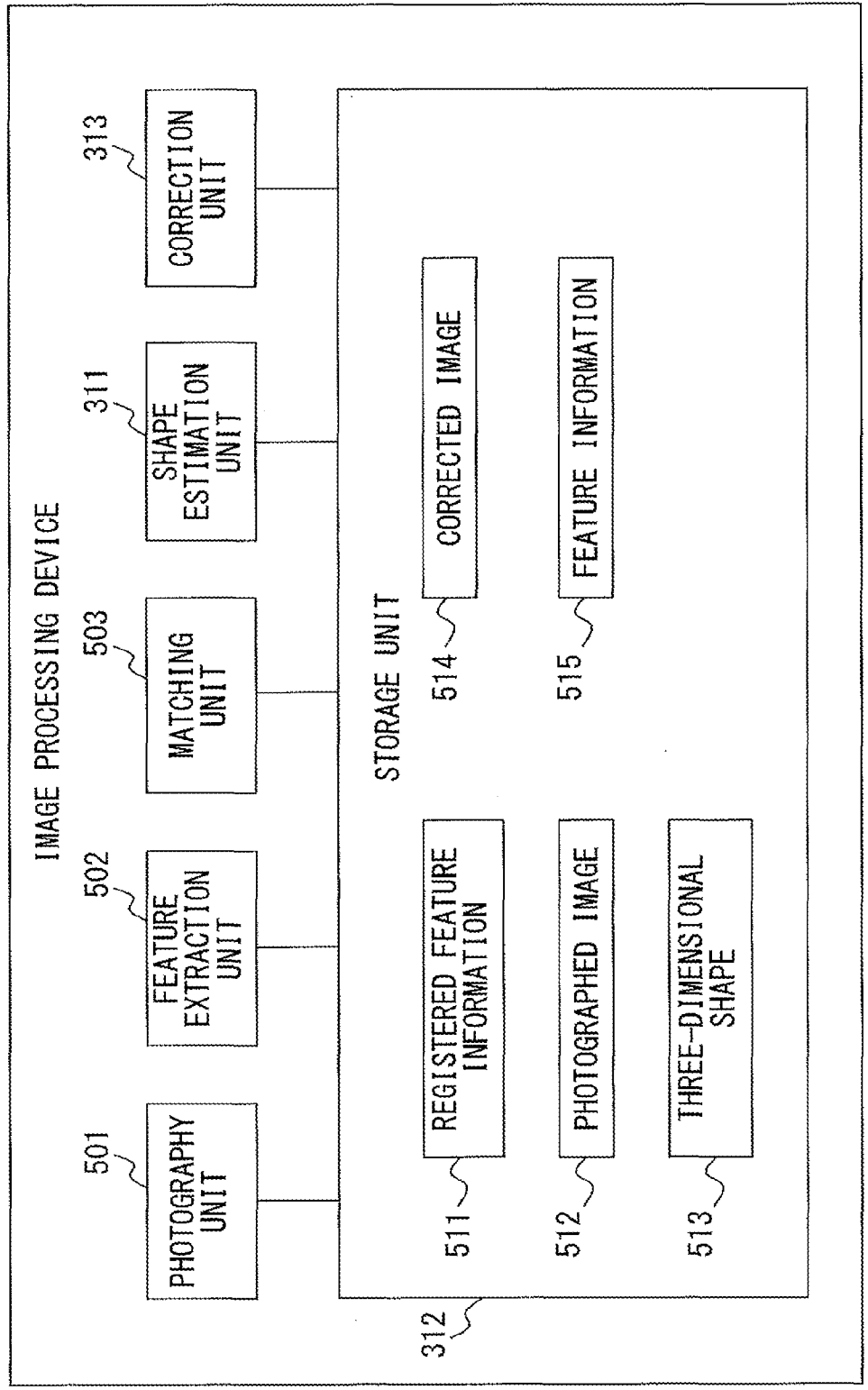
FIG. 5 illustrates a specific example of a functional configuration of the image processing device.

FIG. 5 illustrates a specific example of the image processing device 301 that conducts palm vein authentication. The image processing device 301 illustrated in FIG. 5 includes the shape estimation unit 311, the storage unit 312, the correction unit 313, a photography unit 501, a feature extraction unit 502 and a matching unit 503. The storage unit 312 stores, as registered feature information 511, a vein pattern used for authentication. The registered feature information 511 is also referred to as a registered template.

The photography unit 501 corresponds to the vein sensor and includes an illumination unit and an image pickup element unit. The illumination unit casts illumination light of near infrared rays on the biological body, which is the subject, while the image pickup element unit detects the light reflected from the biological body so as to generate a photographed image 512 of the biological body.

The shape estimation unit 311 applies the SFS technology to the photographed image 512 so as to estimate a three-dimensional shape 513 of the biological body. The three-dimensional shape 513 corresponds to the shape 321 illustrated in FIG. 3. The correction unit 313 performs a normalization process on the photographed image 512 so as to generate a corrected image 514.

The feature extraction unit 502 extracts the vein pattern from the corrected image 514 as feature information 515. The matching unit 503 compares the extracted feature information 515 and registered feature information 511 so as to calculate a similarity between the feature information 515 and the registered feature information 511. Then, the matching unit 503 compares the similarity with a threshold so as to conduct an authentication process on the biological body. For example, when the similarity is higher than the threshold, the biological body is authenticated while when the similarity is equal to or lower than the threshold, the biological body is not authenticated.

Figure 6:
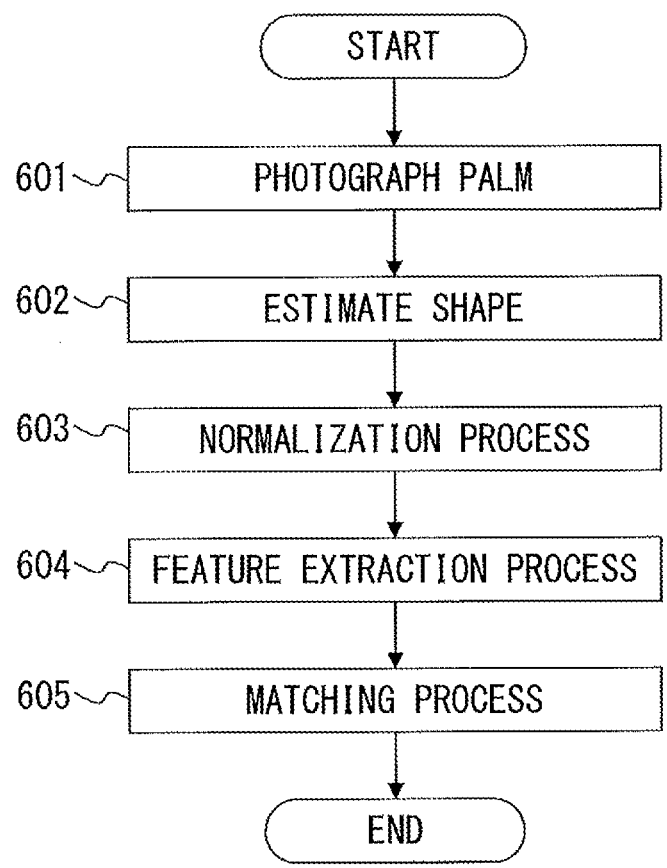
FIG. 6 is a flowchart for a biometric authentication process.

FIG. 6 is a flowchart illustrating an example of a biometric authentication process performed by the image processing device 301 illustrated in FIG. 5. First, the photography unit 501 photographs a palm of an authentication target person so as to generate the photographed image 512, and stores the photographed image 512 in the storage unit 312 (step 601).

Next, the shape estimation unit 311 estimates the three-dimensional shape 513 of the palm from the photographed image 512, and stores the three-dimensional shape 513 in the storage unit 312 (step 602). Then, the correction unit 313 performs a normalization process on the photographed image 512 so as to generate the corrected image 514, and stores the corrected image 514 in the storage unit 312 (step 603).

Next, the feature extraction unit 502 extracts the feature information 515 from the corrected image 514, and stores the feature information 515 in the storage unit 312 (step 604). Then, the matching unit 503 compares the feature information 515 and the registered feature information 511 so as to conduct an authentication process on the biological body (step 605).

Figure 7:
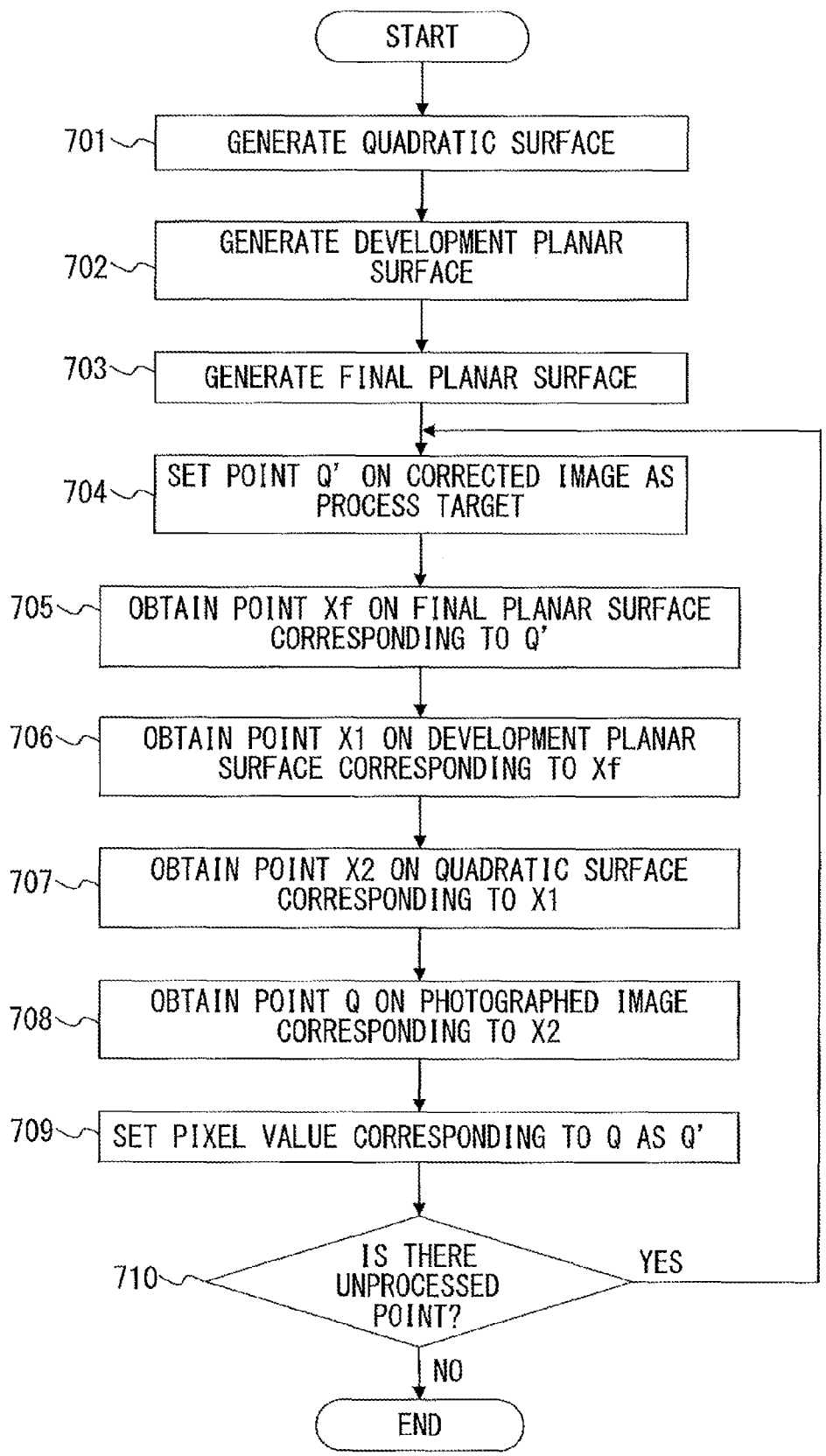
FIG. 7 is a flowchart for a normalization process.

FIG. 7 is a flowchart illustrating an example of the normalization process illustrated in step 603 in FIG. 6. First, the correction unit 313 generates a quadratic surface that connects a plurality of points on the three-dimensional shape 513, and approximates the three-dimensional shape 513 by that quadratic surface (step 701). Then, the correction unit 313 generates a development planar surface that contacts the quadratic surface (step 702), rotates the development planar surface, and generates a final planar surface that is parallel to the image pickup surface of the photography unit 501 (step 703).

Figure 8:
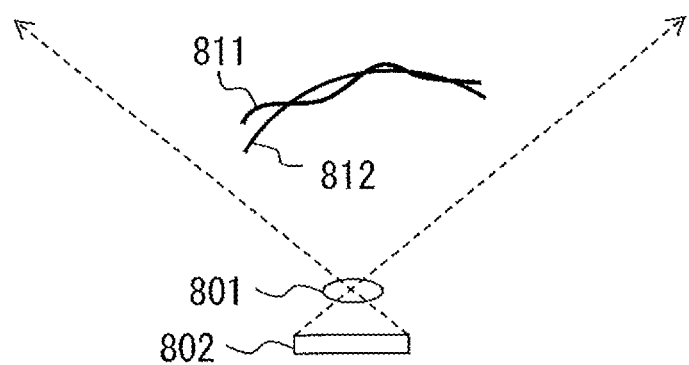
FIG. 8 illustrates a quadratic surface.

FIG. 8 illustrates an example of a quadratic surface. A lens 801 and an image pickup element unit 802 are included in the photography unit 501, and a shape 811 of a real palm has minute concaves and convexes. By approximating the shape 811 of the palm by a quadratic surface 812, it is possible to treat, as the photographed image 512, an image of the quadratic surface 812 projected on the image pickup element unit 802.

Figure 9:
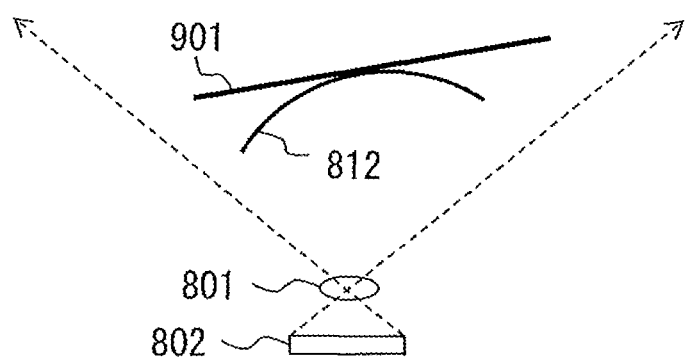
FIG. 9 illustrates a development planar surface.

FIG. 9 illustrates an example of a development planar surface. By developing the quadratic surface 812 to a planar surface, a development planar surface 901 is generated. The development planar surface 901 involves inclination with respect to the image pickup surface of the image pickup element unit 802 in response to the inclination of the shape 811 of the palm.

Figure 10:
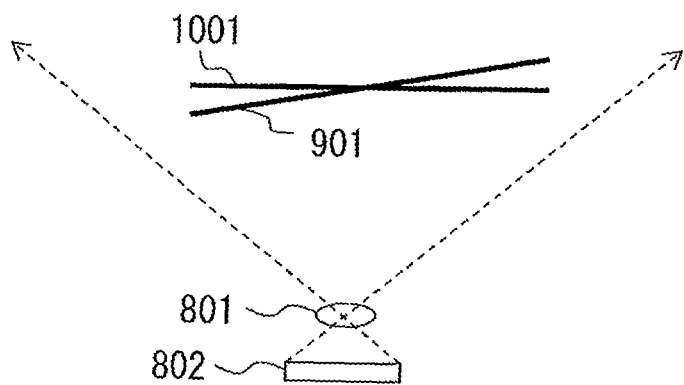
FIG. 10 illustrates a final planar surface.

FIG. 10 illustrates an example of a final planar surface. By rotating the development planar surface 901 so that it becomes parallel to the image pickup surface of the image pickup element unit 802, a final planar surface 1001 is generated. The corrected image 514 corresponds to an image on the final planar surface 1001.

Next, the correction unit 313 performs the development process described in step 704 through step 710 so as to develop each point on the quadratic surface to the development planar surface by the three-dimensional coordinate conversion, and corrects the photographed image 512 on the basis of the position of each of the developed points. In this three-dimensional coordinate conversion, the correction unit 313 obtains point X2 on the quadratic surface corresponding to point Q on the photographed image 512, obtains point X1 on the development planar surface corresponding to point X2, and obtains point Q' on the corrected image 514 corresponding to point X1. Then, the correction unit 313 sets the pixel value of point Q as the pixel value of point Q'. For pixel values of a vein image, brightness values for example are used.

However, because the coordinates of points on an image are expressed by integers in an image conversion process, a process of obtaining point Q before the conversion is often performed with the point Q' after the conversion being treated as the process target. When the coordinates (x,y) (x and y are integers) of point Q before the conversion are treated as a process target, the coordinates (x',y') of point Q' after the conversion are real numbers, which represent a position that does not exist on the corrected image 514.

Accordingly, in the processes described in step 704 through step 710, the correction unit 313 treats the coordinates (x',y') (x' and y' are integers) of point Q' after the conversion as a process target so as to obtain the coordinates (x,y) of point Q before the conversion. In such a case, while (x,y) are real numbers, the pixel values at the position of (x,y) can be calculated by an interpolation process that uses pixel values of surrounding positions. As an interpolation process, bilinear interpolation, bicubic interpolation, etc. can be used.

First, the correction unit 313 sets point Q' on the corrected image 514 as a process target (step 704), obtains point Xf on the final planar surface corresponding to point Q' (step 705), and obtains point X1 on the development planar surface corresponding to point Xf (step 706). Next, the correction unit 313 obtains point X2 on the quadratic surface corresponding to point X1 (step 707), and obtains point Q on the photographed image 512 corresponding to point X2 (step 708). Then, the correction unit 313 calculates the pixel value corresponding to point Q by using the pixel values of the photographed image 512, and sets the calculation result as the pixel value of point Q'.

Next, the correction unit 313 checks whether or not all the points on the corrected image 514 have been processed (step 710), and repeats the processes in and subsequent to step 704 for the next point when there is a point that has not been processed (Yes in step 710). When all the points have been processed, (No in step 710), the correction unit 313 terminates the process. Thereby, the corrected image 514 is generated from the photographed image 512.

According to the normalization process illustrated in FIG. 7, even when the palm is bent or opened excessively, it is possible to generate the corrected image 514 with reduced influence of distortion of the three-dimensional shape of the palm. Even when the registered feature information 511 is being registered, by performing a similar normalization process on a photographed image, the accuracy of the matching process increase, making it possible to obtain correct authentication results.

Next, by referring to FIG. 11 through FIG. 19, specific examples of the processes in step 701 through step 708 illustrated in FIG. 7 will be explained.

Figure 11:
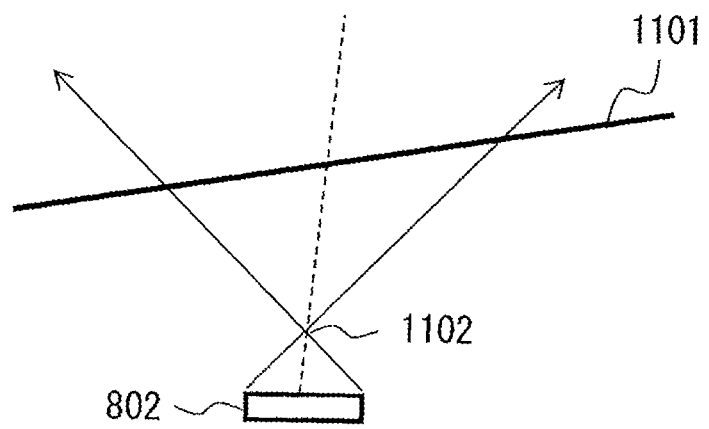
FIG. 11 illustrates a three-dimensional planar surface.

FIG. 11 illustrates an example of a three-dimensional planar surface. When three-dimensional position information is used in an image process, a point on the photographed image 512 photographed by the image pickup element unit 802 or a point on the corrected image 514 is associated with a point in the three-dimensional space. Thus, the correspondence relationship between point Q(u,v) on the image and point P(X,Y,Z) on a three-dimensional planar surface 1101 is discussed.

When the pinhole camera model is used, a point 1102 corresponds to the light source and the center of the lens. When the focal length of the lens is f0 and the value of Z coordinate corresponding to point Q(u,v) is t (t>0), three-dimensional coordinate Q(t) of point Q(u,v) is expressed by the following expression.

$$Q(t) = \left(\frac{u}{f0}t, \frac{v}{f0}t, t\right) \quad (1)$$

The equation of the three-dimensional planar surface 1101 is expressed by the following expression that uses parameters a through c.

$$Z = aX + bY + c \quad (2)$$

Under a condition that point Q(t) is on the three-dimensional planar surface 1101, the following equation for t is obtained.

$$t = a\frac{u}{f0}t + b\frac{v}{f0}t + c \quad (3)$$

When expression (3) is solved for t, solution $t_0$ of the following expression is obtained.

$$t_0 = c\frac{f0}{f0 - au - bv} \quad (4)$$

Point P(X,Y,Z) on the three-dimensional planar surface 1101 corresponding to point Q(u,v) on the image is expressed by the following expression by using $t_0$ of expression (4).

$$Q(t_0) = (X, Y, Z) = \left(\frac{u}{f0}t_0, \frac{v}{f0}t_0, t_0\right) \quad (5)$$

By using expressions (4) and (5), point Q(u,v) on the image and point P(X,Y,Z) on the three-dimensional planar surface 1101 can be associated.

Figure 12:
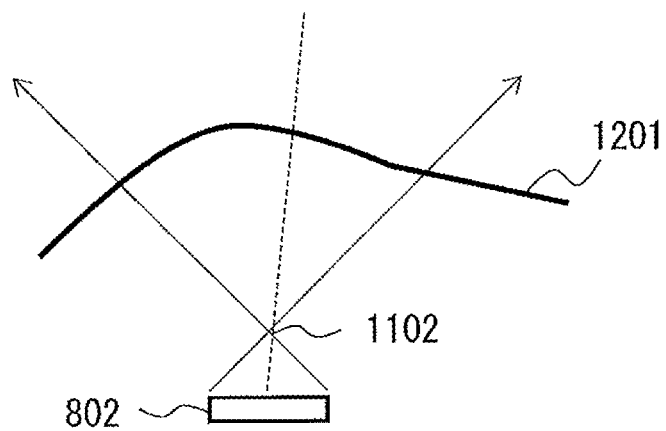
FIG. 12 illustrates a three-dimensional curved surface.

FIG. 12 illustrates an example of a three-dimensional curved surface. The correspondence relationship between point Q(u,v) on the image and point P(X,Y,Z) on a three-dimensional curved surface 1201 is discussed.

When the pinhole camera model is used similarly to the case of FIG. 11, three-dimensional coordinate Q(t) of point Q(u,v) is expressed by expression (1). When the three-dimensional curved surface 1201 is a quadratic surface, the equation of the three-dimensional curved surface 1201 is expressed by the following expression by using parameters a through f.

$$Z = aX^2 + bY^2 + cXY + dX + eY + f \quad (6)$$

Under a condition that point Q(t) is on the three-dimensional curved surface 1201, the following equation for t is obtained.

$$t = a\frac{u^2}{f0^2}t^2 + b\frac{v^2}{f0^2}t^2 + c\frac{uv}{f0^2}t^2 + d\frac{u}{f0}t + e\frac{v}{f0}t + f \quad (7)$$

By organizing expression (7) for t, the following quadratic equation is obtained.

$$\left(a\frac{u^2}{f0^2} + b\frac{v^2}{f0^2} + c\frac{uv}{f0^2}\right)t^2 + \left(d\frac{u}{f0} + e\frac{v}{f0} - 1\right)t + f = 0. \quad (8)$$

By solving expression (8) for t, solution $t_0$ of the following expression is obtained.

$$t_0 = \frac{-B \pm \sqrt{B^2 + 4Af}}{2A} \quad (9)$$

$$A = \left(a\frac{u^2}{f0^2} + b\frac{v^2}{f0^2} + c\frac{uv}{f0^2}\right) \quad (10)$$

$$B = \left(d\frac{u}{f0} + e\frac{v}{f0} - 1\right) \quad (11)$$

While there are two solutions as $t_0$, $t_0$ can uniquely be determined from the condition that t>0. Point P(X,Y,Z) on the three-dimensional curved surface 1201 corresponding to point Q(u,v) on the image is expressed by expression (5) by using determined $t_0$. Then, by expression (5) and expressions (9) through (11), point Q(u,v) and point P(X,Y,Z) can be associated.

In step 701, the correction unit 313 approximates the three-dimensional shape 513 by a quadratic surface. By approximating the three-dimensional shape 513 by a quadratic surface, normal vector etc. on a quadratic surface can be obtained analytically, making it possible perform efficiently a process of developing points on the three-dimensional shape 513 to the development planar surface.

When the pinhole camera model is used similarly to the case of FIG. 12 so as to express, as Z (u,v), the value of Z coordinate of point P(X,Y,Z) on the three-dimensional shape 513, point P(X,Y,Z) is expressed by the following expressions.

$$X = \frac{u}{f0}Z(u, v) \quad (21)$$

$$Y = \frac{v}{f0}Z(u, v) \quad (22)$$

$$Z = Z(u, v) \quad (23)$$

When the respective points on the three-dimensional shape 513 are expressed by $P(X_i,Y_i,Z_i)$ (i=0, 1, 2, ... ), the condition that point $P(X_i,Y_i,Z_i)$ is on a quadratic surface of expression (6) is expressed by the following expression by using a matrix form.

$$A\begin{pmatrix} a \\ b \\ c \\ d \\ e \\ f \end{pmatrix} = Z \quad (24)$$

-continued $$A = \begin{pmatrix} X_0^2 & Y_0^2 & X_0Y_0 & X_0 & Y_0 & 1 \\ X_1^2 & Y_1^2 & X_1Y_1 & X_1 & Y_1 & 1 \\ X_2^2 & Y_2^2 & X_2Y_2 & X_2 & Y_2 & 1 \\ \vdots & \vdots & \vdots & \vdots & \vdots & \vdots \end{pmatrix} \quad (25)$$

$$Z = \begin{pmatrix} Z_0 \\ Z_1 \\ Z_2 \\ \vdots \end{pmatrix} \quad (26)$$

Here, pseudo-inverse matrix $A^+$ of matrix A is obtained.

$$A^+ = (A^T A)^{-1} A^T \quad (27)$$

The parameters of the quadratic surface are expressed by the following expression by using pseudo-inverse matrix $A^+$ of expression (27).

$$\begin{pmatrix} a \\ b \\ c \\ d \\ e \\ f \end{pmatrix} = A^+ Z \quad (28)$$

By using pseudo-inverse matrix $A^+$ of expression (27), it is possible to apply a least squares approximation. For this, by omitting points $P(X_i,Y_i,Z_i)$ on the three-dimensional shape 513 appropriately so as to reduce the number of the points, it is possible to reduce the computation amount of least squares approximation.

In step 702, the correction unit 313 generates a development planar surface contacting the quadratic surface. For this, the correction unit 313 can generate a development planar surface contacting the quadratic surface by approximating the three-dimensional shape 513 by the planar surface. The inclination of the generated development planar surface represents the inclination of the entire palm.

In step 703, the correction unit 313 generates a final planar surface by rotating the development planar surface in order to correct the inclination of the palm. Specifically, the correction unit 313 rotates the development planar surface so that normal vector n of the development planar surface overlaps the unit vector in the direction perpendicular to the image pickup surface of the image pickup element unit 802. As a specific method of such a rotation process, the Rodrigues formula, which will be described later, can be used.

When the position of the palm has shifted in a horizontal direction (direction parallel to the image pickup surface) from the position directly above the image pickup element unit 802, it is also possible to incline the final planar surface so that the straight line connecting the palm and the image pickup element unit 802 is perpendicular to the final planar surface. By inclining the final planar surface in response to the shifting amount in the horizontal direction, it is possible to correct distortion of the photographed image 512 caused by the shifting of the palm.

In step 704, the correction unit 313 sets, as a process target, point Q' on the corrected image 514, and in step 705 obtains point Xf on the final planar surface corresponding to point Q' by using expressions (4) and (5). Next, in step 706, the correction unit 313 obtains point X1 on the development planar surface corresponding to point Xf, and in step 707 obtains point X2 on the quadratic surface corresponding to point X1.

In a method in which points X1 and X2 are associated, an assumption that the distance between two points on the surface of a palm remains unchanged between when the palm is opened and when the palm is bent can be applied. Accordingly, the correction unit 313 obtains point X2 by utilizing the condition that the distance from a reference point to point X1 on the development planar surface and the distance from a reference point to point X2 on the quadratic surface are identical.

Figure 13:
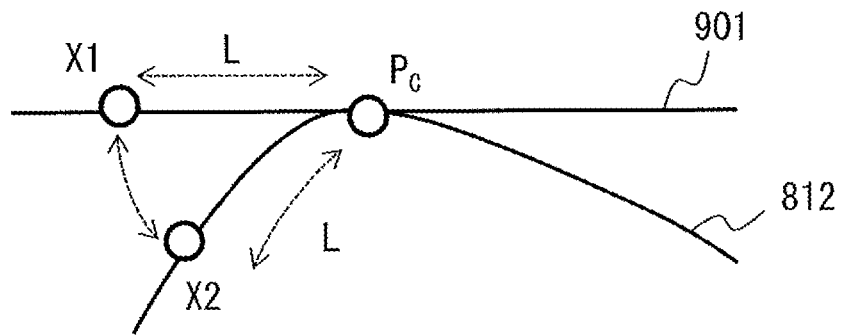
FIG. 13 illustrates a correspondence relationship between a point on a development planar surface and a point on a quadratic surface.

FIG. 13 illustrates an example of the correspondence relationship between point X1 and point X2. In this example, the tangent point between the quadratic surface 812 and the development planar surface 901 is set as reference point $P_C$, and the distance from reference point $P_C$ to point X2 on the quadratic surface 812 is identical to distance L from reference point $P_C$ to point X1 on the development planar surface 901. Reference point $P_C$ is also referred to as a development center and is a point serving as a reference for developing the points on the quadratic surface 812 to the development planar surface 901.

Also, there are a plurality of points that are away by distance L from reference point $P_C$ on the quadratic surface. Accordingly, the correction unit 313 generates a sectional planar surface that cuts the development planar surface and the quadratic surface so as to obtain point X2 treating only points on the sectional planar surface as targets.

Here, the correction unit 313 performs a process of obtaining point X2 from distance L instead of a process of obtaining distance L from point X2. A process of obtaining a distance from a point can be performed relatively easily by using an elliptic integral etc., whereas an inverse process of obtaining a point from a distance is not so easy. Thus, in the process of obtaining point X2 from distance L uses a numerical calculation.

Here, the equation of the quadratic surface can be expressed by expression (6), and the equation of the development planar surface can be expressed by the following expression.

$$Z = pX + qY + r \tag{31}$$

When the three-dimensional coordinates of reference point $P_C$ is $(X_C, Y_C, Z_C)$, reference point $P_C$ exists on both the development planar surface and the quadratic surface, satisfying the following expressions.

$$Z_C = pX_C + qY_C + r \tag{32}$$

$$Z_C = aX_C^2 + bY_C^2 + cX_CY_C + d_CX + eY_C + f \tag{33}$$

In order to obtain corresponding point X2 $(X_2, Y_2, Z_2)$ on the quadratic surface from point X1 $(X_1, Y_1, Z_1)$ on the development planar surface, three conditions are used. The first condition is that point X2 is on the quadratic surface.

$$Z_2 = aX_2^2 + bY_2^2 + cX_2Y_2 + dX_2 + eY_2 + f \tag{34}$$

The second condition is that distance $P_CX2$ from reference point $P_C$ to point X2 on the quadratic surface is identical to distance $P_CX1$ from reference point $P_C$ to point X1 on the development planar surface.

$$P_CX2 = P_CX1 = L \tag{35}$$

The third condition is that point X2 is on a sectional planar surface that cuts the development planar surface and the quadratic surface. FIG. 14 illustrates an example of a sectional planar surface. In this example, a sectional planar surface 1401 is a planar surface that passes through reference point $P_C$ and point X1 and that is perpendicular to the development planar surface 901. The development planar surface 901 and the quadratic surface 812 illustrated in FIG. 13 are on the sectional planar surface 1401.

Hereinafter, explanations will be given for a method of calculating point X2 satisfying the first through third conditions. Normal vector $n_R$ of the sectional planar surface is a vector perpendicular to both a normal vector $(-p, -q, 1)$ of the development planar surface and vector $P_CX1$ from reference point $P_C$ toward point X1. Accordingly, normal vector $n_R$ can be obtained from the outer product of a normal vector $(-p, -q, 1)$ and vector $P_CX1$.

Herein the outer product of vector $\vec{a}$ (referred to as vector a hereinafter) and vector $\vec{b}$ (referred to as vector b) is defined by the following expression.

$$\vec{a} \times \vec{b} = \begin{pmatrix} a_Y b_Z - a_Z b_Y \\ a_Z b_X - a_X b_Z \\ a_X b_Y - a_Y b_X \end{pmatrix} \tag{36}$$

In expression (36), $a_X$, $a_Y$ and $a_Z$ represent an X component, a Y component and a Z component of vector a, while $b_X$, $b_Y$ and $b_Z$ represent an X component, a Y component and a Z component of vector b. When the definition of the outer product of expression (36) is used, normal vector $n_R$ is expressed by the following expression.

$$n_R = \begin{pmatrix} n_{rx} \\ n_{ry} \\ n_{rz} \end{pmatrix} = \begin{pmatrix} -p \\ -q \\ 1 \end{pmatrix} \times \begin{pmatrix} X_1 - X_C \\ Y_1 - Y_C \\ Z_1 - Z_C \end{pmatrix} = \begin{pmatrix} -q(Z_1 - Z_C) - (Y_1 - Y_C) \\ (X_1 - X_C) + p(Z_1 - Z_C) \\ -p(Y_1 - Y_C) + q(Z_1 - Z_C) \end{pmatrix} \tag{37}$$

Because the sectional planar surface passes through point $X1(X_1, Y_1, Z_1)$, constant term C of the equation of the sectional planar surface can be obtained from the following expressions.

$$n_{rx}X_1 + n_{ry}Y_1 + n_{rz}Z_1 + C = 0 \tag{38}$$

$$C = -(n_{rx}X_1 + n_{ry}Y_1 + n_{rz}Z_1) \tag{39}$$

By using normal vector $n_R$ of expression (37) and constant term C of expression (39), the equation of the sectional planar surface is expressed by the following expression.

$$-\frac{n_{rx}}{n_{rz}}X - \frac{n_{rx}}{n_{rz}}Y - \frac{C}{n_{rz}} = Z \tag{40}$$

Here, constants p', q' and r' are defined by the following expressions.

$$p' = -\frac{n_{rx}}{n_{rz}} = -\frac{q(Z_1 - Z_C) + (Y_1 - Y_C)}{p(Y_1 - Y_C) - q(Z_1 - Z_C)} \tag{41}$$

$$q' = -\frac{n_{ry}}{n_{rz}} = \frac{(X_1 - X_C) + p(Z_1 - Z_C)}{p(Y_1 - Y_C) - q(Z_1 - Z_C)} \tag{42}$$

$$r' = -\frac{C}{n_{rz}} \tag{43}$$

$$= \frac{(q(Z_1 - Z_C) + (Y_1 - Y_C))X_1 + (-(X_1 - X_C) - p(Z_1 - Z_C))Y_1 + (p(Y_1 - Y_C) - q(Z_1 - Z_C))Z_1}{p(Y_1 - Y_C) - q(Z_1 - Z_C)}$$

By using constants p', q' and r', the equation of the sectional planar surface is expressed by the following expression.

$$Z = p'X + q'Y + r' \tag{44}$$

Because point X2 $(X_2, Y_2, Z_2)$ exists on the sectional planar surface of expression (44), the third condition is expressed by the following expression.

$$Z_2 = p'X_2 + q'Y_2 + r' \tag{45}$$

Accordingly, the three conditions that are to be satisfied by point X2$(X_2, Y_2, Z_2)$ are expressed by expressions (34), (35) and (45). When expressions (34) and (45) are combined from among those expressions, it is recognized that point X2 moves on the quadratic line. Expression (35) defines a distance from the reference point $P_C$ to point X2 on the quadratic line.

The quadratic line formed by the intersection points of the quadratic surface and the sectional planar surface can be obtained from the simultaneous equations of expression (6) and expression (44). Point X2 can be obtained by associating distance L with the length of a line segment on the quadratic line.

First, in order to make it easier to treat the quadratic surface and the sectional planar surface, the sectional planar surface is rotated so that the normal vector of the sectional planar surface is in the Z axis direction. Thereby, the Z coordinate of the sectional planar surface becomes a constant, simplifying the calculations of distances on the sectional planar surface.

When p', q' and r' are replaced with p, q and r in expression (44) for the sake of simplification of description, the normal vector of the sectional planar surface can be expressed by (-p,-q,1). With this, the process of rotating the sectional planar surface is a process of making unit normal vector $\vec{n_0}$ (referred to as unit normal vector $n_0$ hereinafter) in the following expression identical to unit vector $\vec{n_1}$ (referred to as unit vector $n_1$ hereinafter) in the Z axis direction.

$$\vec{n_0} = (-p, -q, 1)/\sqrt{p^2 + q^2 + 1} \tag{51}$$

$$\vec{n_1} = (0, 0, 1) \tag{52}$$

For this rotation process, the Rodrigues formula as follows can be applied.

$$\vec{X'} = \vec{X}\cos\varphi + \vec{n}(\vec{n}\cdot\vec{X})(1-\cos\varphi) - (\vec{X}\times\vec{n})\sin\varphi \tag{53}$$

In expression (53), Vector $\vec{X}$ (referred to as vector X hereinafter) represents the three-dimensional vector before the rotation while vector $\vec{X'}$ (referred to as vector X' hereinafter) represents the three-dimensional vector after the rotation. Vector $\vec{n}$ (referred to as vector n hereinafter) represents the unit vector in the rotation axis direction, while $\varphi$ represents the rotation angle. Accordingly, when vector X is rotated by angle $\varphi$ with vector n as a rotation axis, vector X' is obtained.

Vector n is set to be in a direction perpendicular to both unit normal vector $n_0$ and unit vector $n_1$. Accordingly, vector n can be obtained from the outer product of unit normal vector $n_0$ and unit vector $n_1$.

$$\vec{n} \approx \begin{pmatrix} -p \\ -q \\ 1 \end{pmatrix} \times \begin{pmatrix} 0 \\ 0 \\ 1 \end{pmatrix} = \begin{pmatrix} -q \\ p \\ 0 \end{pmatrix} \tag{54}$$

$$\vec{n} = \begin{pmatrix} -q \\ p \\ 0 \end{pmatrix} \bigg/ \sqrt{p^2 + q^2} \tag{55}$$

Cosine of angle $\varphi$ can be obtained from the inner product of unit normal vector $n_0$ and unit vector $n_1$.

$$\cos\phi = \vec{n_0} \cdot \vec{n_1} = \frac{1}{\sqrt{p^2 + q^2 + 1}} \tag{56}$$

$$\sin\phi = \frac{\sqrt{p^2 + q^2}}{\sqrt{p^2 + q^2 + 1}} \tag{57}$$

By applying expression (55) through expression (57) to expression (53) based on an assumption that the components of vector X are (X,Y,Z) and the components of vector X' are (X',Y',Z'), the following expression is obtained.

$$\begin{pmatrix} X' \\ Y' \\ Z' \end{pmatrix} = \vec{X'} = \vec{X}\cos\phi + \vec{n}(\vec{n}\cdot\vec{X})(1-\cos\phi) - (\vec{X}\times\vec{n})\sin\phi \tag{58}$$

$$= \frac{1}{\sqrt{p^2+q^2+1}}\vec{X} + \vec{n}(\vec{n}\cdot\vec{X})\frac{\sqrt{p^2+q^2+1}-1}{\sqrt{p^2+q^2+1}} - \frac{\sqrt{p^2+q^2}}{\sqrt{p^2+q^2+1}}(\vec{X}\times\vec{n})$$

$$= \frac{1}{\sqrt{p^2+q^2+1}}\left[\vec{X} + (\vec{n}\cdot\vec{X})(\sqrt{p^2+q^2+1}-1)\vec{n} - \sqrt{p^2+q^2}(\vec{X}\times\vec{n})\right]$$

$$= \frac{1}{\sqrt{p^2+q^2+1}}\left[\begin{pmatrix} X \\ Y \\ Z \end{pmatrix} + \frac{-qX+pY}{p^2+q^2}(\sqrt{p^2+q^2+1}-1)\begin{pmatrix} -q \\ p \\ 0 \end{pmatrix} - \begin{pmatrix} X \\ Y \\ Z \end{pmatrix} \times \begin{pmatrix} -q \\ p \\ 0 \end{pmatrix}\right]$$

$$= \frac{1}{\sqrt{p^2+q^2+1}}\left[\begin{pmatrix} X \\ Y \\ Z \end{pmatrix} + \frac{-qX+pY}{p^2+q^2}(\sqrt{p^2+q^2+1}-1)\begin{pmatrix} -q \\ p \\ 0 \end{pmatrix} - \begin{pmatrix} -pZ \\ -qZ \\ pX+qY \end{pmatrix}\right]$$

-continued $$= \frac{1}{\sqrt{p^2+q^2+1}} \begin{pmatrix} X + pZ + q\frac{qX-pY}{p^2+q^2}(\sqrt{p^2+q^2+1}-1) \\ Y + qZ - p\frac{qX-pY}{p^2+q^2}(\sqrt{p^2+q^2+1}-1) \\ Z - pX - qY \end{pmatrix}$$

$$= \frac{1}{\sqrt{p^2+q^2+1}} \begin{pmatrix} 1 + \frac{q^2}{p^2+q^2}(\sqrt{p^2+q^2+1}-1) & -\frac{pq}{p^2+q^2}(\sqrt{p^2+q^2+1}-1) & p \\ -\frac{pq}{p^2+q^2}(\sqrt{p^2+q^2+1}-1) & 1 + \frac{p^2}{p^2+q^2}(\sqrt{p^2+q^2+1}-1) & q \\ -p & -q & 1 \end{pmatrix} \begin{pmatrix} X \\ Y \\ Z \end{pmatrix}$$

The sectional planar surface after the rotation is a planar surface where $Z'$ is a constant as expressed by the following expression.

$$Z' = \frac{r}{\sqrt{p^2+q^2+1}} \quad (59)$$

A rotation process similar to that applied to the sectional planar surface is applied also to the quadratic surface. when vector $X'=(X',Y',Z')$ after the rotation is given, the conversion expression expressing vector $X=(X,Y,Z)$ before the rotation is expressed by the following expression.

$$\begin{pmatrix} X \\ Y \\ Z \end{pmatrix} = \frac{1}{\sqrt{p^2+q^2+1}} \begin{pmatrix} 1 + \frac{q^2}{p^2+q^2}(\sqrt{p^2+q^2+1}-1) & -\frac{pq(\sqrt{p^2+q^2+1}-1)}{p^2+q^2} & -p \\ -\frac{pq(\sqrt{p^2+q^2+1}-1)}{p^2+q^2} & 1 + \frac{p^2(\sqrt{p^2+q^2+1}-1)}{p^2+q^2} & -q \\ p & q & 1 \end{pmatrix} \begin{pmatrix} X' \\ Y' \\ Z' \end{pmatrix} \quad (60)$$

Here, the coefficients of the matrix expressing the rotation of the right-hand member of expression (60) are defined by the following expression.

$$\begin{pmatrix} X \\ Y \\ Z \end{pmatrix} = \begin{pmatrix} a_{11}(p,q) & a_{12}(p,q) & a_{13}(p,q) \\ a_{21}(p,q) & a_{22}(p,q) & a_{23}(p,q) \\ a_{31}(p,q) & a_{32}(p,q) & a_{33}(p,q) \end{pmatrix} \begin{pmatrix} X' \\ Y' \\ Z' \end{pmatrix} \quad (61)$$

When $(X,Y,Z)$ of expression (61) is substituted into expression (6) representing the quadratic surface before the rotation, the following expression is obtained as an equation of the quadratic line on the sectional planar surface after the rotation.

$$a(a_{11}X'+a_{12}Y'+a_{13}Z')^2 + b(a_{21}X'+a_{22}Y'+a_{23}Z')^2 + c(a_{11}X'+a_{12}Y'+a_{13}Z')(a_{21}X'+a_{22}Y'+a_{23}Z') + d(a_{11}X'+a_{12}Y'+a_{13}Z') + e(a_{21}X'+a_{22}Y'+a_{23}Z') + f = a_{31}X'+a_{32}Y'+a_{33}Z' \quad (62)$$

By organizing expression (62) for $X'$, $Y'$ and $Z'$, the following expression is obtained.

$$(aa_{11}^2+ba_{21}^2+ca_{11}a_{21})X'^2+(aa_{12}^2+ba_{22}^2+ca_{12}a_{22})Y'^2+ \\ (aa_{13}^2+ba_{23}^2+ca_{13}a_{23})Z'^2+(2aa_{11}a_{12}+2ba_{21}a_{22}+ \\ ca_{11}a_{22}+ca_{12}a_{21})X'Y'+(2aa_{12}a_{13}+2ba_{22}a_{23}+ \\ ca_{12}a_{23}+ca_{13}a_{22})Y'Z'+(2aa_{13}a_{11}+2ba_{23}a_{21}+ \\ ca_{13}a_{21}+ca_{11}a_{23})Z'X'+(da_{11}+ea_{21}-a_{31})X'+(da_{12}+ \\ ea_{22}-a_{32})Y'+(da_{13}+ea_{23}-a_{33})Z'+f=0 \quad (63)$$

By further organizing expression (63), the following expression is obtained.

$$(aa_{11}^2+ba_{21}^2+ca_{11}a_{21})X'^2+(aa_{12}^2+ba_{22}^2+ca_{12}a_{22})Y'^2+ \\ (2aa_{11}a_{12}+2ba_{21}a_{22}+ca_{11}a_{22}+ca_{12}a_{21})X'Y'+ \\ (da_{11}+ea_{21}-a_{31}+(2aa_{13}a_{11}+2ba_{23}a_{21}+ca_{13}a_{21}+ \\ ca_{11}a_{23})Z')X'+(da_{12}+ea_{22}-a_{32}+(2aa_{12}a_{13}+ \\ 2ba_{22}a_{23}+ca_{12}a_{23}+ca_{13}a_{22})Z')Y'+(aa_{13}^2+ba_{23}^2+ \\ ca_{13}a_{23})Z'^2+(da_{13}+ea_{23}-a_{33})Z'+f=0 \quad (64)$$

Here, constants A through F are defined by the following expressions.

$$A = aa_{11}^2 + ba_{21}^2 + ca_{11}a_{21} \quad (65)$$

$$B = aa_{12}^2 + ba_{22}^2 + ca_{12}a_{22} \quad (66)$$

$$C = 2aa_{11}a_{12} + 2ba_{21}a_{22} + ca_{11}a_{22} + ca_{12}a_{21} \quad (67)$$

$$D = da_{11}+ea_{21}-a_{31}+(2aa_{13}a_{11}+2ba_{23}a_{21}+ca_{13}a_{21}+ca_{11}a_{23})Z' \quad (68)$$

$$E = da_{12}+ea_{22}-a_{32}+(2aa_{12}a_{13}+2ba_{22}a_{23}+ca_{12}a_{23}+ca_{13}a_{22})Z \quad (69)$$

$$F = (aa_{13}^2+ba_{23}^2+ca_{13}a_{23})Z'^2+(da_{13}+ea_{23}-a_{33})Z'+f \quad (70)$$

$Z'$ of expressions (68) through (70) are constants expressed by expression (59). By using constants A through F of expressions (65) through (70), the equation of the quadratic line of expression (64) is expressed by the following expression.

$$AX^2+BY^2+CXY+DX+EY+F=0 \quad (71)$$

Then, coordinates $(X_C, Y_C, Z_C)$ of reference point $P_C$ on the sectional planar surface also moves to coordinates $(X_C', Y_C', Z_C')$ expressed by the following expression by the rotation process.

$$\begin{pmatrix} X_C' \\ Y_C' \\ Z_C' \end{pmatrix} = \begin{pmatrix} a_{11}(p,q) & a_{12}(p,q) & a_{13}(p,q) \\ a_{21}(p,q) & a_{22}(p,q) & a_{23}(p,q) \\ a_{31}(p,q) & a_{32}(p,q) & a_{33}(p,q) \end{pmatrix}^{-1} \begin{pmatrix} X_C \\ Y_C \\ Z_C \end{pmatrix} \quad (72)$$

Next, a method for calculating a distance on the quadratic line of expression (71) will be explained. The process of obtaining the distance between reference point $P_C$ and point X2 on the quadratic surface is replaced with a process of obtaining a length on the quadratic line of expression (71). For quadratic lines, there can be three patterns, specifically ellipse, hyperbola and parabola, and thus a method for calculating a length on a quadratic line is discussed for each of these patterns.

First, a case where the quadratic line is an ellipse is explained. The equation of an ellipse is expressed as in the following expression.

$$\frac{X^2}{a^2} + \frac{Y^2}{b^2} = 1 \tag{81}$$

By applying coordinate conversion including rotation and parallel translation to expression (71), it is possible to transform expression (71) into the form of expression (81). In a case of a quadratic surface for approximating the shape of a palm, the quadratic line of expression (71) often becomes an ellipse.

Figure 15:
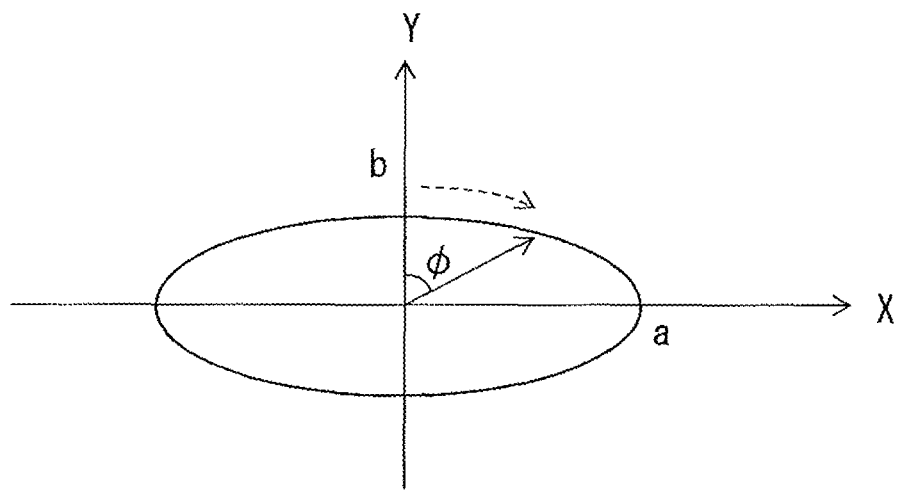
FIG. 15 illustrates an ellipse.

FIG. 15 illustrates an example of the ellipse of expression (81). A process of obtaining the distance between point P1 and point P2 on this ellipse is discussed. In that case, point P1 corresponds to reference point $P_C$ and point P2 corresponds to point X2. The perimeter of an ellipse can be obtained from an incomplete elliptic integral of the second kind. An incomplete elliptic integral of the second kind is an integral that represents the perimeter of an ellipse whose angle φ is from zero to prescribed value θ. Hereinafter, an incomplete elliptic integral of the second kind is simply referred to as an elliptic integral.

An elliptic function representing an elliptic integral is defined only in the first quadrant, and accordingly when point P1 or point P2 exists in the second through fourth quadrants, a process is performed in which one-fourth of the circumference of the ellipse is added or subtracted properly. Also, as directions for calculating a perimeter from an elliptic integral, there are two directions, i.e., the positive and negative directions of angle θ. Accordingly, when point P2 that is away from point P1 on an ellipse by distance L is obtained, the distance calculation is conducted for the two directions.

Figure 16:
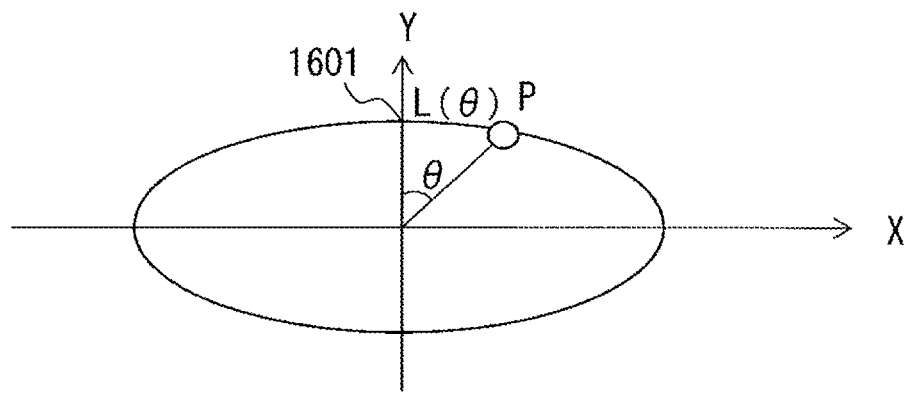
FIG. 16 illustrates the perimeter of an ellipse.

First, on the ellipse depicted in FIG. 16, perimeter L(θ) from an intersection point 1601 of the ellipse and the Y axis to point P is expressed by the following expression by using an elliptic integral.

$$L(\theta) = aE(\theta, k^2) = a\int_0^\theta \sqrt{1 - k^2 \sin^2\phi}\, d\phi \tag{82}$$

E (θ,k²) of expression (82) is an incomplete elliptic integral function of the second kind, and k is a constant representing an ellipse. Between coordinates (X,Y) of point P and angle θ, there is a relationship as expressed by the following expressions.

$$X = a \sin \theta \tag{83}$$

$$Y = b \cos \theta \tag{84}$$

Figure 17:
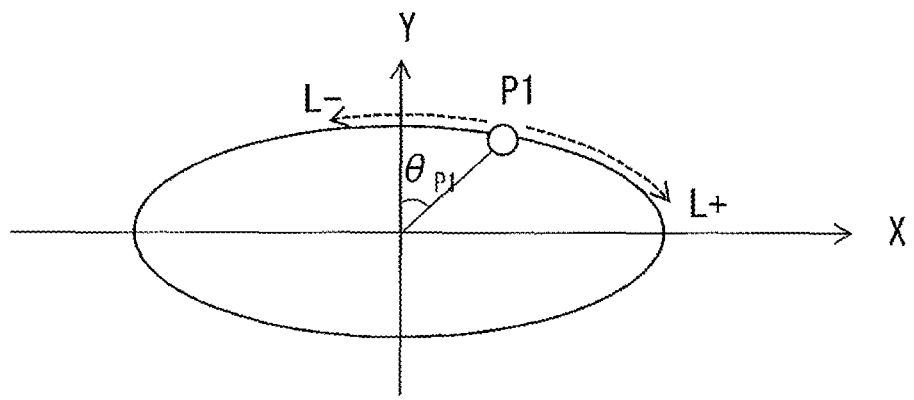
FIG. 17 illustrates a process of obtaining a point on an ellipse.

By expression (83) and expression (84), angle $\theta_{P1}$ corresponding to point P1 ($X_{P1}, Y_{P1}$) in FIG. 17 is expressed by the following expressions.

$$X_{P1} = a \sin \theta_{P1} \tag{85}$$

$$Y_{P1} = b \cos \theta_{P1} \tag{86}$$

Point P2 is a point that is away from point P1 by distance L in positive or negative direction of angle φ. Accordingly, assuming that the angle corresponding to point P2 is θ, the process of obtaining point P2 is replaced with a process of obtaining angle θ that satisfies the following expression.

$$L(\theta) = L(\theta_{P1}) \pm L = L_\pm \tag{87}$$

As a method of obtaining angle θ that satisfies expression (87), a numerical calculation can be used. When the Newton's method is used as a numerical calculation, angle θ that satisfies f(θ)=0 can be obtained numerically by defining function f(θ) of the following expressions.

$$f(\theta) = L(\theta) - L_\pm = 0 \tag{88}$$

$$f'(\theta) = L'(\theta) = a\sqrt{1 - k^2 \sin^2\theta} \tag{89}$$

Then, the following expression is applied repeatedly as a recurrence formula for angle θ.

$$\theta_{n+1} = \theta_n - \frac{f(\theta_n)}{f'(\theta_n)} \tag{90}$$

Here, from among two points corresponding to two values of angle θ, which are obtained as the solution of f(θ)=0, the point closer to point X1 on the sectional planar surface is adopted as point P2 (point X2).

A Carlson symmetric form can be used as a calculation for obtaining a numerical solution of an incomplete elliptic integral function of the second kind. In such a case, the incomplete elliptic integral function of the second kind is expressed by the following expression.

$$E(\varphi,k) = \sin \varphi R_F(\cos^2\varphi, 1 - k^2 \sin^2\varphi, 1) - \frac{1}{3}k^2 \sin^3\varphi R_D \\ (\cos^2\varphi, 1 - k^2 \sin^2\varphi, 1) \tag{91}$$

$R_F$ and $R_D$ of expression (91) are functions called Carlson symmetric formula. Here, the input coefficients of $R_F$ and $R_D$ are expressed by X, Y and Z as in the following expressions.

$$X = \cos^2\varphi \tag{92}$$

$$Y = 1 - k^2 \sin^2\varphi \tag{93}$$

$$Z = 1 \tag{94}$$

Then, expression (91) is expressed by the following expression.

$$E(\varphi,k) = \sin \varphi R_F(X,Y,Z) - \frac{1}{3}k^2 \sin^3\varphi R_D(X,Y,Z) \tag{95}$$

Next, explanations will be given for a case where the quadratic line is hyperbolic. The equations of the hyperbola are expressed by the following expressions.

$$\frac{X^2}{a^2} - \frac{Y^2}{b^2} = 1 \tag{101}$$

$$-\frac{X^2}{a^2} + \frac{Y^2}{b^2} = 1 \tag{102}$$

As the forms of a hyperbola, there are two patterns, specifically, the patterns of expression (101) and expression (102), and the form of expression (101) is called an East-West opening hyperbola, while the form of expression (102) is called a North-South opening hyperbola. By applying coordinate conversion including rotation and parallel translation to expression (71), it is possible to transform expression (71) into the form of expression (101) or expression (102).

FIG. 18 illustrates an example of a hyperbola in the form of expression (102). This example illustrates one of the two curves included in a hyperbola. A hyperbola in the form of expression (102) can be treated as a specific shape of an ellipse.

First, when "a" of expression (102) is replaced with "$a_r$", the following expression is obtained.

$$-\frac{X^2}{a_r^2} + \frac{Y^2}{b^2} = 1 \tag{103}$$

Here, a real number $a_r$ is used so as to define a pure imaginary number a.

$$a = ia_r \tag{104}$$

By using pure imaginary number a of expression (104), expression (103) can be rewritten to the form of expression (81). As described above, a hyperbola in the form of expression (102) can be treated as an ellipse for which constant a is set to a complex number (strictly, a pure imaginary number).

A hyperbola can be expressed by the following expressions by using parameter θ.

$$X = a \sin h(\theta) \tag{105}$$

$$Y = b \cos h(\theta) \tag{106}$$

A hyperbola can be considered as an ellipse of a case when constant a and angle θ are both pure imaginary numbers. Here, when constant a is set to pure imaginary number ia and angle θ is set to pure imaginary number iθ in expression (83) and expression (84), the following expressions are obtained.

$$X = ia \sin(i\theta) \tag{107}$$

$$Y = b \cos(i\theta) \tag{108}$$

Between cos θ and sin θ and between cos h θ and sin sh θ, the relationships as expressed by the following expressions exist.

$$\sin(i\theta) = \sin h(\theta) \tag{109}$$

$$\cos(i\theta) = \cos h(\theta) \tag{110}$$

By using expression (109) and expression (110), expression (107) and expression (108) can be transformed into the following expressions.

$$X = -a \sin h(\theta) \tag{111}$$

$$Y = b \cos h(\theta) \tag{112}$$

Expression (111) and expression (112) express a hyperbola. As is expressed by these expressions, by setting constant a and angle θ to pure imaginary numbers in equations of an ellipse, equations of a hyperbola can be obtained. Similar transform can be applied also to elliptic integration for obtaining the perimeter of an ellipse. In such a case, the angle in the elliptic integration is set to a pure imaginary number.

When for example angle φ of expression (92) and expression (93) is set to pure imaginary number $i\varphi_r$, the following expressions are obtained.

$$X = \cos^2(i\varphi_r) = \cos h^2(\varphi_r) \tag{113}$$

$$Y = 1 + k^2 \sin h^2(\varphi_r) \tag{114}$$

Then, both X and Y are real numbers. Accordingly, $R_F$ and $R_D$ of expression (95) are real numbers similarly to the case of an ellipse, and accordingly it is sufficient to implement $R_F$ and $R_D$ only for input coefficients of real numbers.

Next, explanations will be given for a case where the quadratic line is parabolic. An equation of a parabola is expressed by the following expression.

$$Y = aX^2 \tag{121}$$

By applying coordinate conversion including rotation and parallel translation to expression (71), it is possible to transform expression (71) into the form of expression (121).

Figure 19:
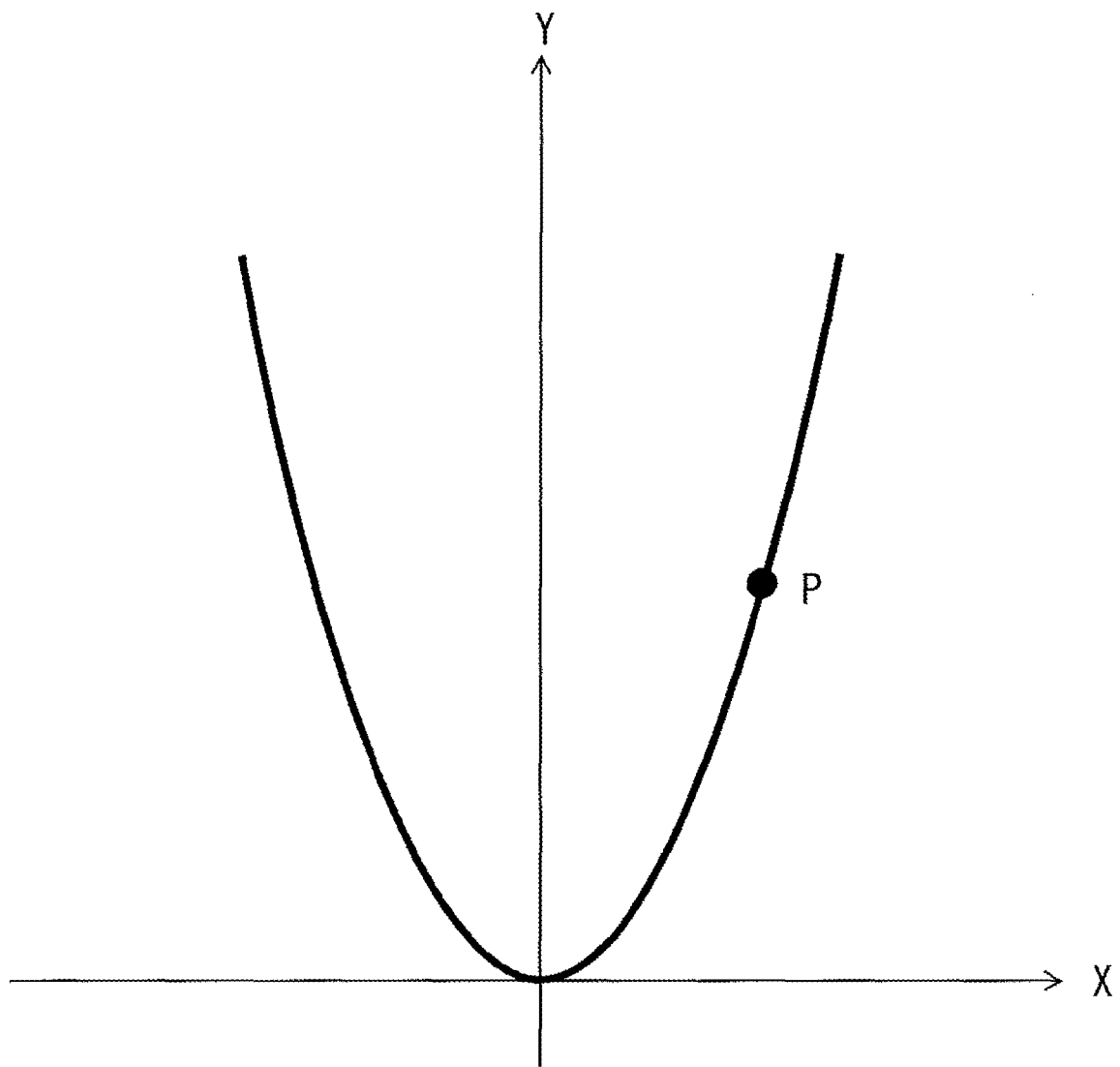
FIG. 19 illustrates a parabola.

FIG. 19 illustrates an example of the parabola of expression (121). The arc length of the parabola in the scope with X being from x0 through x1 is obtained through the integration of the following expression.

$$L(x0, x1) = \int_{x0}^{x1} \sqrt{1 + \left(\frac{dY}{dX}\right)^2} \, dX = \int_{x0}^{x1} \sqrt{1 + 4a^2 X^2} \, dX \tag{122}$$

Here, the integration variable of expression (121) is converted into variable t of the following expression.

$$t = 2aX + \sqrt{1 + 4a^2 X^2} \tag{123}$$

X is expressed by the following expression by using t of expression (123).

$$t^2 - 4aXt + 4a^2 X^2 = 1 + 4a^2 X^2 \tag{124}$$

$$X = \frac{t^2 - 1}{4at} \tag{125}$$

By differentiating the right-hand member and the left-hand member of expression (123) in order to obtain dX, the following expression is obtained.

$$\frac{dt}{dX} = 2a + \frac{1}{2} \frac{8a^2 X}{\sqrt{1 + 4a^2 X^2}} \tag{126}$$

From expression (126), dX is expressed by the following expression.

$$dX = \frac{\sqrt{1 + 4a^2 X^2}}{2a\sqrt{1 + 4a^2 X^2} + 4a^2 X} dt \tag{127}$$

From expression (121) and expression (127), arc length L(x0,x1) of expression (122) is replaced with L(t0,t1) of the following expression.

$$L(t0, t1) = \int_{t0}^{t1} \sqrt{1 + 4a^2 X^2} \frac{\sqrt{1 + 4a^2 X^2}}{2a\sqrt{1 + 4a^2 X^2} + 4a^2 X} dt \tag{128}$$

$$= \frac{1}{2a} \int_{t0}^{t1} \frac{1 + 4a^2 X^2}{\sqrt{1 + 4a^2 X^2} + 2aX} dt$$

-continued $$= \frac{1}{2a} \int_{t0}^{t1} \frac{1 + \frac{(t^2-1)^2}{4t^2}}{t} dt$$

$$= \frac{1}{8a} \int_{t0}^{t1} \frac{t^4 + 2t^2 + 1}{t^3} dt$$

$$= \frac{1}{8a} \int_{t0}^{t1} \left(t + 2\frac{1}{t} + \frac{1}{t^3}\right) dt$$

$$= \frac{1}{8a} \left[\frac{1}{2}t^2 + 2\log(t) - \frac{1}{2}t^{-2}\right]_{t0}^{t1}$$

t0 and t1 of expression (128) are expressed by the following expressions.

$$t_0 = 2ax_0 + \sqrt{1 + 4a^2 x_0^2} \quad (129)$$

$$t_1 = 2ax_1 + \sqrt{1 + 4a^2 x_1^2} \quad (130)$$

When point X2 away from reference point $P_C$ by distance L on the parabola is obtained, a numerical calculation is conducted by using expression (128) through expression (130).

First, when it is assumed that x0=0 and x1=x in expression (122), arch length L(x0,x1) is replaced by L(x) of the following expression.

$$L(x) = \int_0^x \sqrt{1 + 4a^2 X^2} \, dX \quad (131)$$

L(x) of expression (131) is a function representing the arc length from the origin to point P(x,y), and can be obtained analytically from expression (128) through expression (130). Here, it is defined that L(x) is a positive value when x>0 and is a negative value when x<0. In a case when the X coordinate of reference point $P_C$ is $X_C$ and point P(x,y) corresponds to point X2, the following expression is satisfied.

$$L(x) = L(X_C) + L = L0 \quad (132)$$

$L(X_C)$ of expression (132) is a positive value when $X_C>0$ and is a negative value when $X_C<0$. When the Newton's method is used as a numerical calculation, function f(x) of the following expression is defined in order to obtain x that satisfies expression (132).

$$f(x) = L(x) - L0 \quad (133)$$

x satisfying expression (132) is x satisfying f(x)=0. The differentiation of f(x) is expressed by the following expression.

$$f'(x) = L'(x) = \sqrt{1 + 4a^2 x^2} \quad (134)$$

Then, the following expression is applied as a recurrence formula for x.

$$x_{n+1} = x_n - \frac{f(x_n)}{f'(x_n)} \quad (135)$$

When point X2 has been obtained on the quadratic surface in step 707, the correction unit 313 obtains in step 708 point Q on the photographed image 512 corresponding to point X2 on the basis of the relationships of expression (5) and expressions (9) through (11).

As described above, by approximating the three-dimensional shape 513 by the quadratic surface, it is possible to replace a distance on the three-dimensional shape 513 with a distance on a quadratic line such as an ellipse etc., making it relatively easy to implement a calculation of a distance on a palm. This eliminates the necessity of searching for point X2 corresponding to point X1 on the three-dimensional shape 513, reading to a higher speed of the processing.

Note that it is also possible to omit pixels appropriately so as to reduce the number of process target pixels instead of applying the normalization process illustrated in FIG. 7 to all pixels on the corrected image 514 and to obtain the pixel values of the remaining pixels by linear interpolation etc. Because changes in quadratic surfaces are smooth, interpolation processes cause almost no influence on the accuracy of the corrected image 514.

Also, while the normalization process illustrated in FIG. 7 generates the corrected image 514 by correcting the positions of pixels on the photographed image 512, the accuracy of the corrected image 514 can further be increased by correcting the pixel values in addition to the position of pixels.

The brightness value of each point on the photographed image 512 can be calculated from the distance from the photography unit 501 to the subject and from the local inclination of the subject. Specifically, brightness value I(u,v) of point Q(u,v) on the photographed image 512 can be calculated by the following expression.

$$I(u, v) = I_0 \frac{\cos\theta}{R^2} \quad (141)$$

R of expression (141) represents a distance between the image pickup element unit and a point on the subject, and θ represents an angle between a vector from the image pickup element unit toward the point on the subject and the normal vector of the tangent plane at the point on the subject. $I_0$ is a constant. From expression (141), it is understood that brightness value I(u,v) is inversely proportional to the square of distance R and is directly proportional to cos θ. By using the relationship of expression (141), a brightness value corresponding to point X1 on the development planar surface can be estimated from the brightness value corresponding to point X2 on the quadratic surface on the basis of the equations of the development planar surface and the quadratic surface.

Figure 20:
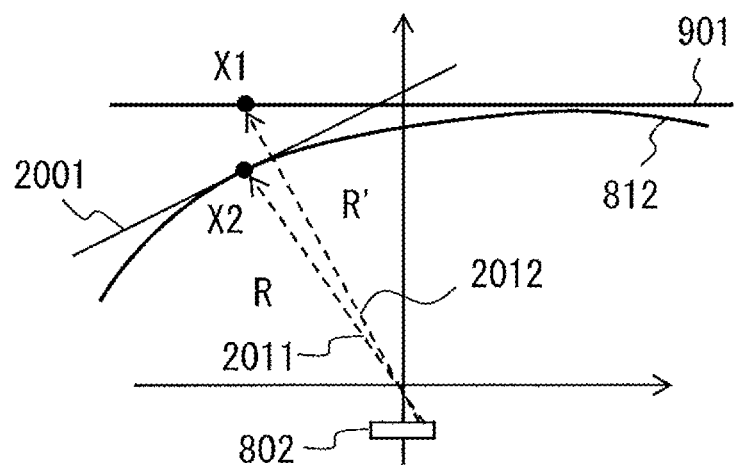
FIG. 20 illustrates distances from the image pickup element unit to the development planar surface and to the quadratic surface.

FIG. 20 illustrates an example of a distance from the image pickup element unit to the development planar surface and the quadratic surface. In this example, the distance from the image pickup element unit 802 to point X2 on the quadratic surface 812 is R and the distance from the image pickup element unit 802 to point X1 of the development planar surface 901 is R'. The correction unit 313 performs a brightness value correction process in step 709 illustrated in FIG. 7, and obtains brightness value I' (u,v) corresponding to point X1 by the following expression from brightness value I(u,v) corresponding to point X2.

$$I'(u, v) = I(u, v) \frac{R^2}{(R')^2} \frac{\cos\theta'}{\cos\theta} \quad (142)$$

θ of expression (142) represents an angle between a vector 2011 from image pickup element unit 802 toward point X2 and a normal vector of a tangent plane 2001 contacting the quadratic surface 812 at point X2. θ' represents an angle between a vector 2012 from image pickup element unit 802 toward point X1 and a normal vector of the development planar surface 901.

Then, the correction unit 313 sets, as the pixel value of point Q', the brightness value corresponding to point X1 instead of the brightness value corresponding to point X2.

To the right-hand member of expression (142), a coefficient based on the brightness distribution intrinsic to the vein sensor may be added. In such a case, the storage unit 312 stores information of the three-dimensional brightness distribution of the vein sensor and the correction unit 313 obtains the brightness value corresponding to point X1 on the basis of the three-dimensional brightness distribution. Thereby, the accuracy of the brightness value correction process increases further.

While expression (141) is based on an ideal point light source model, brightness value I(u,v) is not always inversely proportional to the square of distance R in actual vein sensors. Accordingly, it is also possible to use a calculation formula in which brightness value I(u,v) is inversely proportional to the a-th power of distance R instead of using expression (141). In such a case, the following expression is used instead of expression (142).

$$I'(u,v) = I(u,v) \frac{R^\alpha}{(R')^\alpha} \frac{\cos\theta'}{\cos\theta} \qquad (143)$$

Here, explanations will be given for a process of obtaining a normal vector of a tangent plane contacting the quadratic surface. When point P on the quadratic surface is expressed by P(u,v) by using variables u and v, normal vector $\vec{n}$ (referred to as normal vector n hereinafter) of the tangent plane at point P is expressed by the following expression by using position vector $\vec{p}$ (referred to as position vector p hereinafter) of point P.

$$\vec{n} = \frac{\vec{p}_u \times \vec{p}_v}{|\vec{p}_u \times \vec{p}_v|} \qquad (151)$$

In expression (151), suffixes u and v of position vector p respectively represent partial differentiation with respect to variables u and v. Here, when variables u and v represent the X and Y coordinates of point P in the three-dimensional space, point P(X,Y,Z) is a point on a quadratic surface and thus is expressed by the following expression.

$$(X,Y,Z) = (u,v,au^2+bv^2+cuv+du+ev+f) \qquad (152)$$

In the above situation, partial differentiation of position vector p in expression (151) is expressed by the following expressions.

$$\vec{p}_u = \begin{pmatrix} 1 \\ 0 \\ 2au+cv+d \end{pmatrix} \qquad (153)$$

$$\vec{p}_v = \begin{pmatrix} 0 \\ 1 \\ 2bv+cu+e \end{pmatrix} \qquad (154)$$

From expression (153) and expression (154), the numerator and the denominator of the right-hand member of expression (151) are obtained by the following expressions.

$$\vec{p}_u \times \vec{p}_v = \begin{pmatrix} -(2au+cv+d) \\ -(2bv+cu+e) \\ 1 \end{pmatrix} \qquad (156)$$

$$|\vec{p}_u \times \vec{p}_v| = \sqrt{(2au+cv+d)^2 + (2bv+cu+e)^2 + 1} \qquad (157)$$

By expression (156) and expression (157), normal vector n of expression (151) is obtained by the following expression.

$$\vec{n} = \begin{pmatrix} \frac{-(2au+cv+d)}{\sqrt{(2au+cv+d)^2 + (2bv+cu+e)^2 + 1}} \\ \frac{-(2bv+cu+e)}{\sqrt{(2au+cv+d)^2 + (2bv+cu+e)^2 + 1}} \\ \frac{1}{\sqrt{(2au+cv+d)^2 + (2bv+cu+e)^2 + 1}} \end{pmatrix} \qquad (158)$$

By performing a brightness value correction process, it is possible to generate an image that is expected to be seen when the palm is held flat, increasing the accuracy of the normalization process. This makes it possible to perform a feature extraction process stably, increasing the accuracy of the matching process further.

Incidentally, the quadratic surface obtained by approximating the shape of a palm represents the degree of the bending of the palm, and accordingly the palm in a posture appropriate for a feature extraction process can be photographed by leading the authentication target person on the basis of the bending detected from the quadratic surface. Leading is a process in which whether or not a palm of the authentication target person is held properly is determined and the determination result is fed back to the authentication target person.

Figure 21:
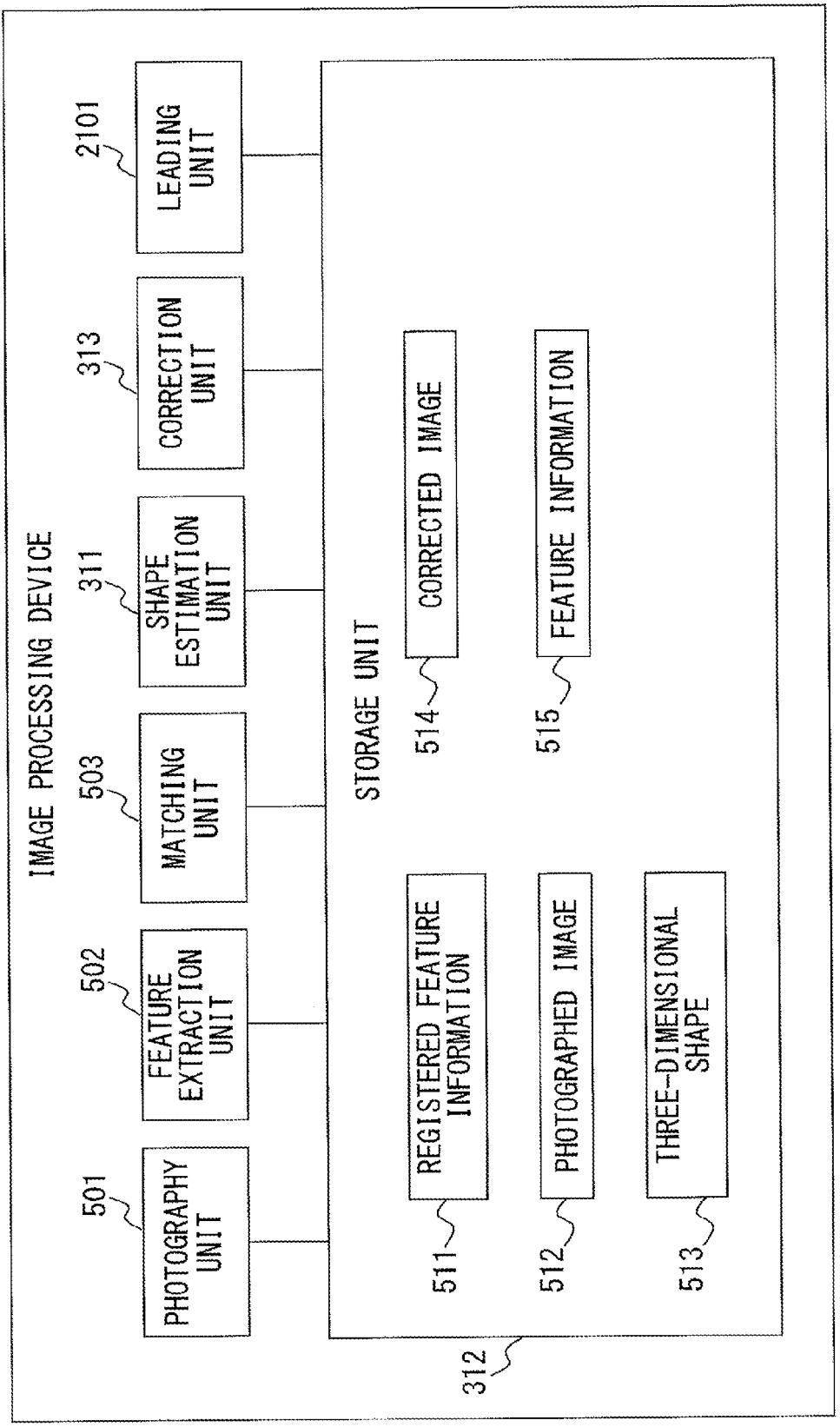
FIG. 21 illustrates a functional configuration of an image processing device that conducts leading.

FIG. 21 illustrates a specific example of the image processing device 301 that conducts the above leading. The image processing device 301 illustrated in FIG. 21 has a configuration in which a leading unit 2101 has been added to the image processing device 301 illustrated in FIG. 5. The leading unit 2101 calculates the curvatures at a plurality of points on the quadratic surface and conducts the leading on the basis of the curvatures.

In the case of three-dimensional shape, there can be an infinite number of curvatures at a point, and differently from two-dimensional shape, various curvatures such as a Gaussian curvature, an average curvature, etc. can be defined as a curvature at a point. Among these various curvatures, the leading unit 2101 calculates a prescribed curvature.

Because the normalization process conducted by the correction unit 313 conducts a large amount of computation, when leading is conducted, it is desired that only approximation based on the quadratic surface be conducted among processes included in the normalization process so as to develop points on the quadratic surface to the development planar surface at a time when the curvature has entered a prescribed scope due to the leading. Thereby, it is possible to increase the accuracy of the normalization process while conducting the feedback for the authentication target person promptly.

Figure 22:
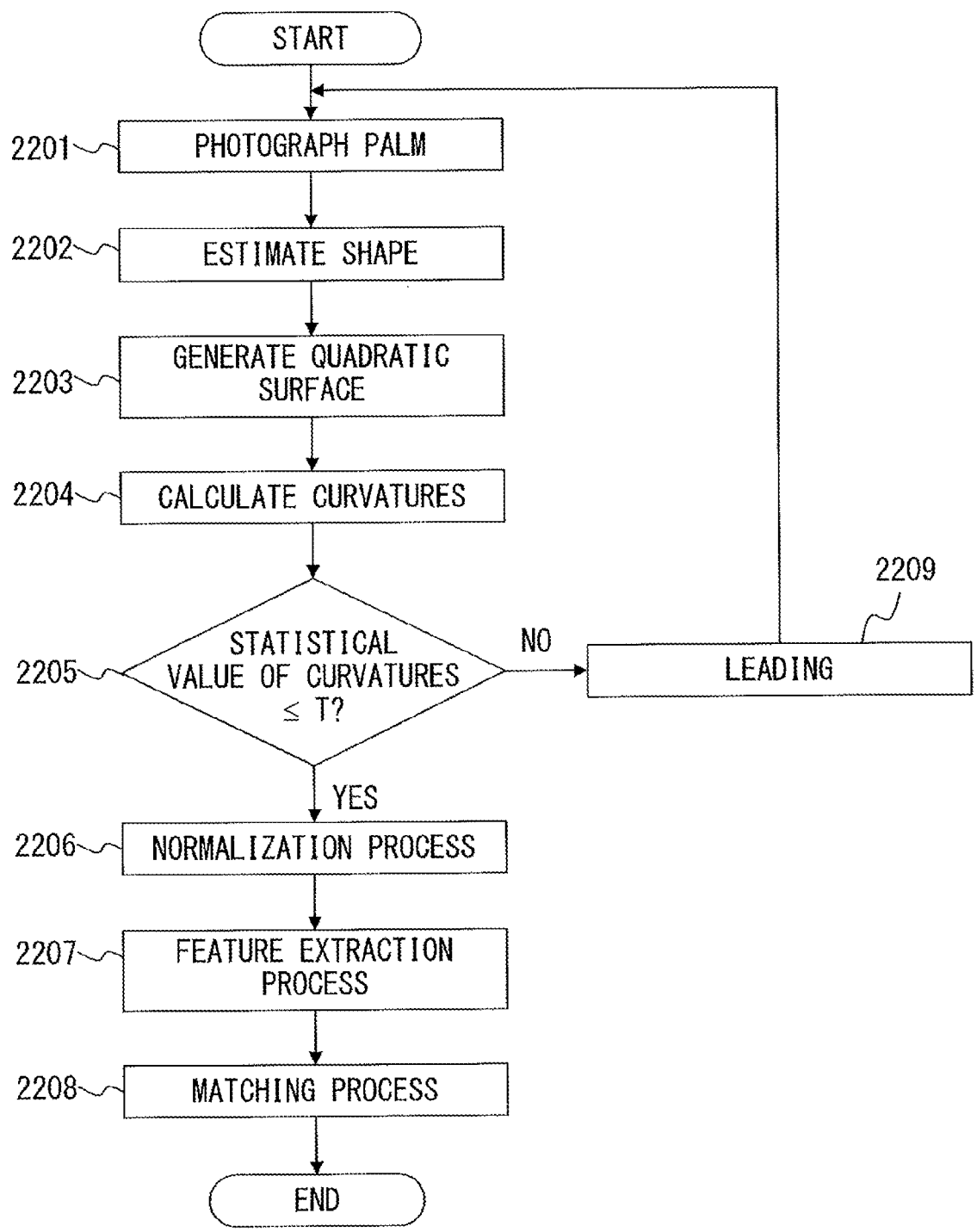
FIG. 22 is a flowchart for a biometric authentication process that conducts leading on the basis of a curvature.

FIG. 22 is a flowchart illustrating an example of a biometric authentication process performed by the image processing device 301 illustrated in FIG. 21. The processes in steps 2201, 2202, 2207 and 2208 illustrated in FIG. 22 are similar to those in steps 601, 602, 604 and 605 illustrated in FIG. 6. Also, the process in step 2203 illustrated in FIG. 22 is similar to that in step 701 illustrated in FIG. 7.

In step 2204, the leading unit 2101 calculates the curvatures at a plurality of points on the quadratic surface generated by the correction unit 313 so as to obtain the statistical value of the curvatures of the plurality of points. As a statistical value of curvatures, the average value, the median value, the maximum value, the minimum value, etc. can be used.

Next, the leading unit 2101 compares the statistical value of the curvatures and threshold T (step 2205). When the statistical value of the curvatures is greater than threshold T (No in step 2205), a leading message is output instructing the target person to open the palm (step 2209). Then, the image processing device 301 repeats the processes in and subsequent to step 2201.

When the statistical value of the curvatures is equal to or smaller than threshold T (Yes in step 2205), the correction unit 313 performs the normalization process (step 2206). The normalization process in step 2206 corresponds to the processes in step 702 through 710 illustrated in FIG. 7.

Here, the process of calculating a curvature on the quadratic surface is explained. Distance ds from point P to a point that is very close to point P on the quadratic surface is expressed by the following expression.

$$ds^2 = E du^2 + F du dv + G dv^2 \quad (161)$$

E, F and G of expression (161) are expressed by the following expressions by using partial differentiation of position vector p of point P.

$$E = \vec{p}_u \cdot \vec{p}_u \quad (162)$$

$$F = \vec{p}_u \cdot \vec{p}_v \quad (163)$$

$$G = \vec{p}_v \cdot \vec{p}_v \quad (164)$$

By using expression (153) and expression (154), E, F and G of expression (162) through expression (164) are expressed by the following expressions.

$$E = 1 + (2au + cv + d)^2 \quad (165)$$

$$F = (2au + cv + d)(2bv + cu + e) \quad (166)$$

$$G = 1 + (2bv + cu + e)^2 \quad (167)$$

First, L, M and N in the following expressions are obtained in order to obtain Gaussian curvature K and average curvature H at point P.

$$L = \vec{p}_{uu} \cdot \vec{n} \quad (168)$$

$$M = \vec{p}_{uv} \cdot \vec{n} \quad (169)$$

$$N = \vec{p}_{vv} \cdot \vec{n} \quad (170)$$

By expression (153) and expression (154), the second order partial differentiation of position vector p of expression (168) through expression (170) are expressed by the following expressions.

$$\vec{p}_{uu} = \begin{pmatrix} 0 \\ 0 \\ 2a \end{pmatrix} \quad (171)$$

$$\vec{p}_{uv} = \begin{pmatrix} 0 \\ 0 \\ c \end{pmatrix} \quad (172)$$

$$\vec{p}_{vv} = \begin{pmatrix} 0 \\ 0 \\ 2b \end{pmatrix} \quad (173)$$

When expression (171) through expression (173) are used, L, M and N of expression (168) through expression (170) are expressed by the following expressions.

$$L = \frac{2a}{\sqrt{(2au + cv + d)^2 + (2bv + cu + e)^2 + 1}} \quad (174)$$

$$M = \frac{c}{\sqrt{(2au + cv + d)^2 + (2bv + cu + e)^2 + 1}} \quad (175)$$

$$N = \frac{2b}{\sqrt{(2au + cv + d)^2 + (2bv + cu + e)^2 + 1}} \quad (176)$$

Gaussian curvature K at point P is expressed by the following expression by using E, F and G of expression (165) through expression (167) and expression (174) through expression (176).

$$K = \frac{LN - M^2}{EG - F^2} \quad (177)$$

Average curvature H at point P is expressed by the following expression.

$$H = \frac{EN + GL - 2FM}{2(EG - F^2)} \quad (178)$$

Figure 23:
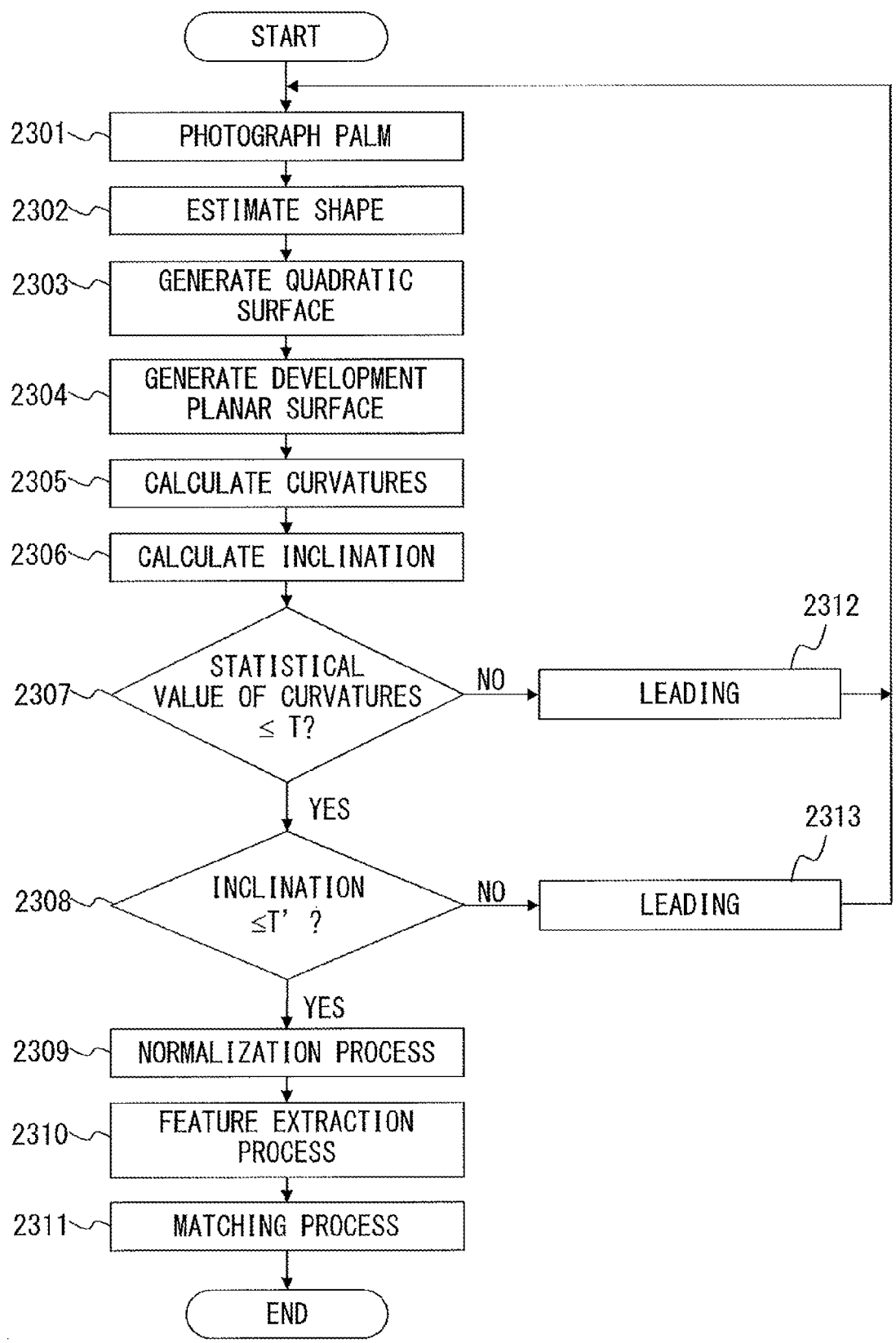
FIG. 23 is a flowchart for a biometric authentication process that conducts leading on the basis of a curvature and an inclination.

In step 2205, the leading unit 2101 may determine whether or not the inclination of the palm is within a prescribed scope in addition to the comparison between the statistical value of the curvatures and threshold T. FIG. 23 is a flowchart illustrating an example of a biometric authentication process to which the determination of a palm inclination has been added.

The processes in steps 2301 through 2303, 2305, 2307, and 2310 through 2312 in FIG. 23 are similar to those in steps 2201 through 2205 and 2207 through 2209 in FIG. 22.

In step 2304, the correction unit 313 generates a development planar surface similarly to step 702 illustrated in FIG. 7, and leading unit 2101 calculates the inclination of the development planar surface on the basis of the normal vector of the development planar surface in step 2306. As the inclination of the development planar surface, the angle between the image pickup surface of the image pickup element unit and the development planar surface for example can be used.

When the statistical value of the curvatures is equal to or smaller than threshold T (Yes in step 2307), the leading unit 2101 compares the inclination of the development planar surface and threshold T' (step 2308). When the inclination is greater than threshold T' (No in step 2308), the leading unit 2101 outputs a leading message instructing the user to hold the palm parallelly to the image pickup surface (step 2313). Then, the image processing device 301 repeats the processes in and subsequent to step 2301.

When the inclination is equal to or smaller than threshold T' (Yes in step 2308), the image processing device 301 performs the normalization process (step 2309). The normalization process in step 2309 corresponds to the processes in step 703 through step 710 illustrated in FIG. 7.

The biometric authentication process illustrated in FIG. 6, FIG. 22 and FIG. 23 can be applied to biometric authentication other than palm vein authentication. The normalization process can be applied to for example palm line authentication or palm pattern authentication, which use palm as a target.

Incidentally, in the biometric authentication process illustrated in FIG. 6, FIG. 22 and FIG. 23, the correction unit 313 applies the development processes in step 704 through step 710 to the entirety of the photographed image 512 so as to generate the corrected image 514. This stabilizes the feature extraction process so as to increase the accuracy of the matching process.

However, the development process can be applied to some of points on the photographed image 512 instead of the entirety of the photographed image 512. For example, the feature information 515 is information representing a pattern such as a vein pattern, palm lines, a palm pattern, etc. and points on these patterns correspond to some of points on the photographed image 512. Accordingly, it is possible to apply the development process to the feature information 515 instead of the photographed image 512.

In such a case, the feature extraction unit 502 extracts the feature information 515 from the photographed image 512 so as to store the feature information 515 in the storage unit 312, and the correction unit 313 performs the development process on points on the pattern represented by the feature information 515 so as to generate a corrected pattern and store the corrected pattern in the storage unit 312. The matching unit 503 compares the corrected pattern and the registered feature information 511 so as to perform the authentication process on the biological body. Applying the development process to the feature information 515 is expected to lead to the following two advantages.

The first advantage is the reduction in the computation amount. When the development process is applied to the entirety of the photographed image 512, all points (all pixels) on the photographed image 512 are to be processed. When the development process is applied to the feature information 515, only points on the pattern represented by the feature information 515 are to be processed, resulting in the reduction in the computation amount for the development process.

The second advantage is the improvement of the interchangeability. When the registered feature information 511 has been generated from a photographed image not having received the development process, applying of the development process only to a photographed image of the authentication target person may decrease the accuracy of the matching process. This is because even when a registered person and the authentication target person are identical and the shapes of the palms are also identical between when they were registered and when they are matched, applying the development process only to a photographed image of one of such persons may lead to a situation where the two pieces of feature information are not similar.

Accordingly, in order to increase the interchangeability between feature information having received the development process and feature information not having received the development process, a method may be conceivable to register as the registered feature information 511 feature information not having received the development process. In such a case, when the biometric authentication process is performed, the development process is applied to both the registered feature information 511 and the feature information 515 of the authentication target person.

Figure 24:
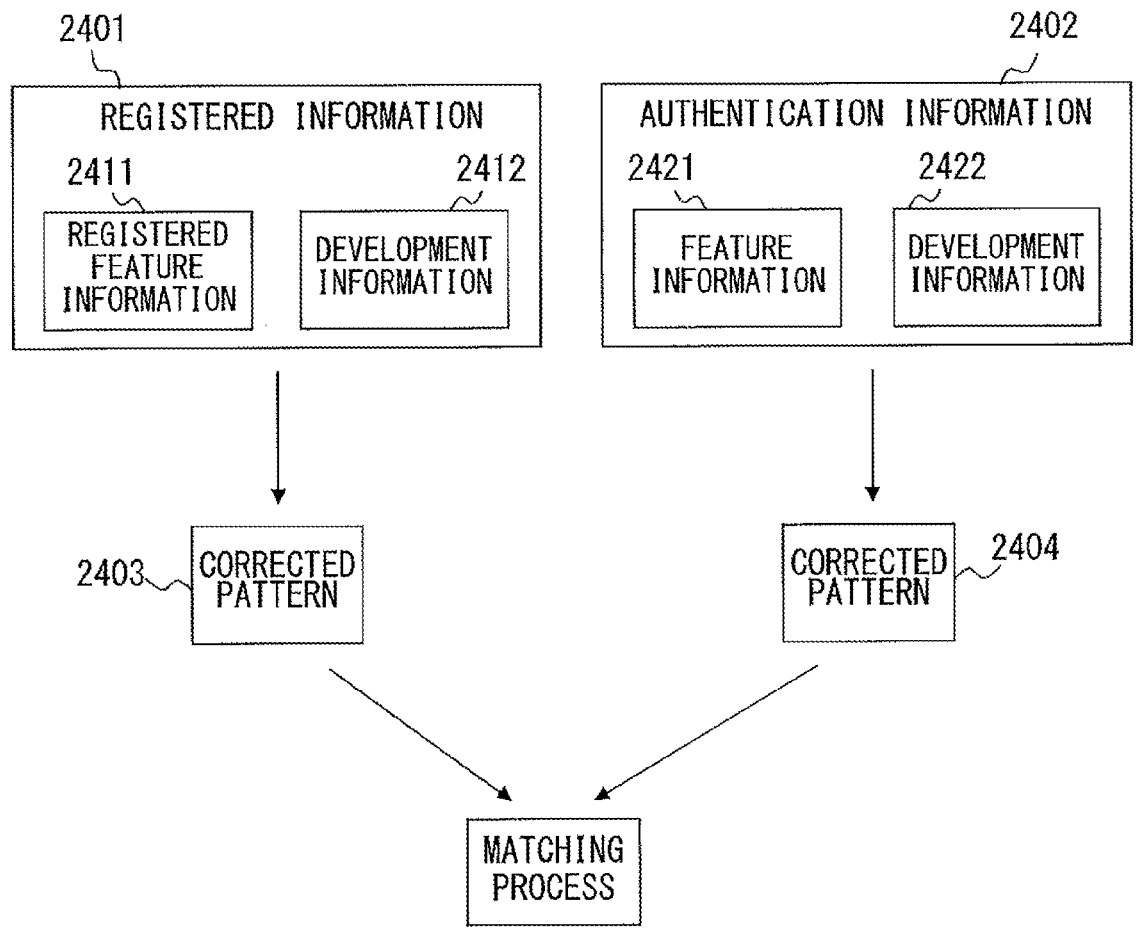
FIG. 24 illustrates a biometric authentication process using a development information.

FIG. 24, illustrates an example of a biometric authentication process as described above. Registered information 2401 includes registered feature information 2411 that has not received the development process and development information 2412 while authentication information 2402 includes feature information 2421 that has not received the development process and development information 2422.

The development information 2412 is information used for performing the development process on the registered feature information 2411, and the development information 2422 is information used for performing the development process on the feature information 2421. The development information 2412 and the development information 2422 include information of the three-dimensional shape 513 corresponding to the palm, an equation representing the quadratic surface, the focal length of the image pickup element unit, the pixel size of the image pickup element unit, etc. When the same image pickup element unit is used for the registration and the authentication, the pixel size of the image pickup element unit can be omitted.

In the biometric authentication process, the correction unit 313 uses the development information 2412 so as to perform the development process on the registered feature information 2411, and generates a corrected pattern 2403. Then, the correction unit 313 uses the development information 2422 so as to perform the development process on the feature information 2421, and generates a corrected pattern 2404. Then, the matching unit 503 performs the matching process of comparing the corrected pattern 2403 and the corrected pattern 2404.

FIG. 25 illustrates an example of a biometric authentication process where the registered information 2401 does not include the development information 2412. The registered information 2401 includes only the registered feature information 2411 and does not include the development information 2412. In such a case, the correction unit 313 does not perform the development process on the registered feature information 2411 and the feature information 2421, and the matching unit 503 performs the matching process of directly comparing the registered feature information 2411 and the feature information 2421. Even when the registered information 2401 includes the development information 2412 and the authentication information 2402 does not include the development information 2422, a matching process similar to that illustrated in FIG. 25 is performed.

By registering registered feature information and development information separately as described above, the accuracy of the matching process can be increased while maintaining the interchangeability of feature information.

The configurations of the image processing device 301 illustrated in FIG. 3, FIG. 5 and FIG. 21 are just examples and some of the constituents can be omitted or changed in accordance with the purposes or conditions of the image processing device 301. When for example the storage unit 312 has stored the photographed image 512 beforehand, the photography unit 501 illustrated in FIG. 5 can be omitted. Also, when the image processing device 301 does not perform the biometric authentication process, the feature extraction unit 502 and the matching unit 503 illustrated in FIG. 5 can be omitted.

The flowcharts illustrated in FIG. 4, FIG. 6, FIG. 7, FIG. 22 and FIG. 23 are just examples and some of the processes can be omitted or changed in accordance with the configurations or conditions of the image processing device 301. When for example the storage unit 312 has stored the photographed image 512 beforehand, the processes in step 601 illustrated in FIG. 6, step 2201 illustrated in FIG. 22 and step 2301 illustrated in FIG. 23 can be omitted. Also, when the image processing device 301 does not perform the biometric authentication process, the processes in step 604 and step 605 illustrated in FIG. 6, step 2207 and step 2208 illustrated in FIG. 22, and step 2310 and step 2311 illustrated in FIG. 23 can be omitted.

In step 601 illustrated in FIG. 6, step 2201 illustrated in FIG. 22 and step 2301 illustrated in FIG. 23, the photography unit 501 may generate the photographed image 512 by using illumination light that is not near infrared rays. It is also possible to use an object that is not a palm as the subject.

In step 602 illustrated in FIG. 6, step 2202 illustrated in FIG. 22 and step 2302 illustrated in FIG. 23, the shape estimation unit 311 may estimate the shape of the subject by using a method that is not the SFS technology.

When it is not necessary to correct the inclination of the palm in the normalization process illustrated in FIG. 7, the process in step 703 can be omitted. In such a case, the correction unit 313 uses the development planar surface as the final planar surface. In step 704 through step 710 illustrated in FIG. 7, the correction unit 313 may obtain point Q' after the conversion by treating point Q before the conversion as the process target instead of obtaining point Q before the conversion by treating point Q' after the conversion as the process target.

It is also possible in FIG. 23 to switch the order of the processes in step 2305 and step 2306 and to switch the order of the processes in step 2307 and step 2308.

The shape 811 of a palm, the quadratic surface 812, the development planar surface 901, the three-dimensional planar surface 1101 and the sectional planar surface 1401 illustrated in FIG. 8 through FIG. 10, FIG. 13, FIG. 14 and FIG. 20 are just examples, and the shape of a palm, the quadratic surface, the development planar surface, the final planar surface and the sectional planar surface may be different from those explained in the examples.

Expression (1) through expression (178) are just examples, and the normalization process, the brightness value correction process or the curvature calculation may be conducted by a different calculation formula or a different coordinate system. For example, the correction unit 313 may generate a development planar surface by using a different method instead of approximating the three-dimensional shape 513 by a planar surface, and may set a different point in the three-dimensional space as reference point $P_C$ instead of the tangent point between the quadratic surface and the development planar surface.

Also, the correction unit 313 may obtain point X2 by using a different condition instead of a condition that the distance from reference point $P_C$ to point X2 on the quadratic surface is identical to the distance from reference point $P_C$ to point X1 on the development planar surface. The correction unit 313 may also obtain point X2 by using a different condition instead of a condition that point X2 exists on a sectional planar surface that cuts the development planar surface and the quadratic surface.

Figure 26:
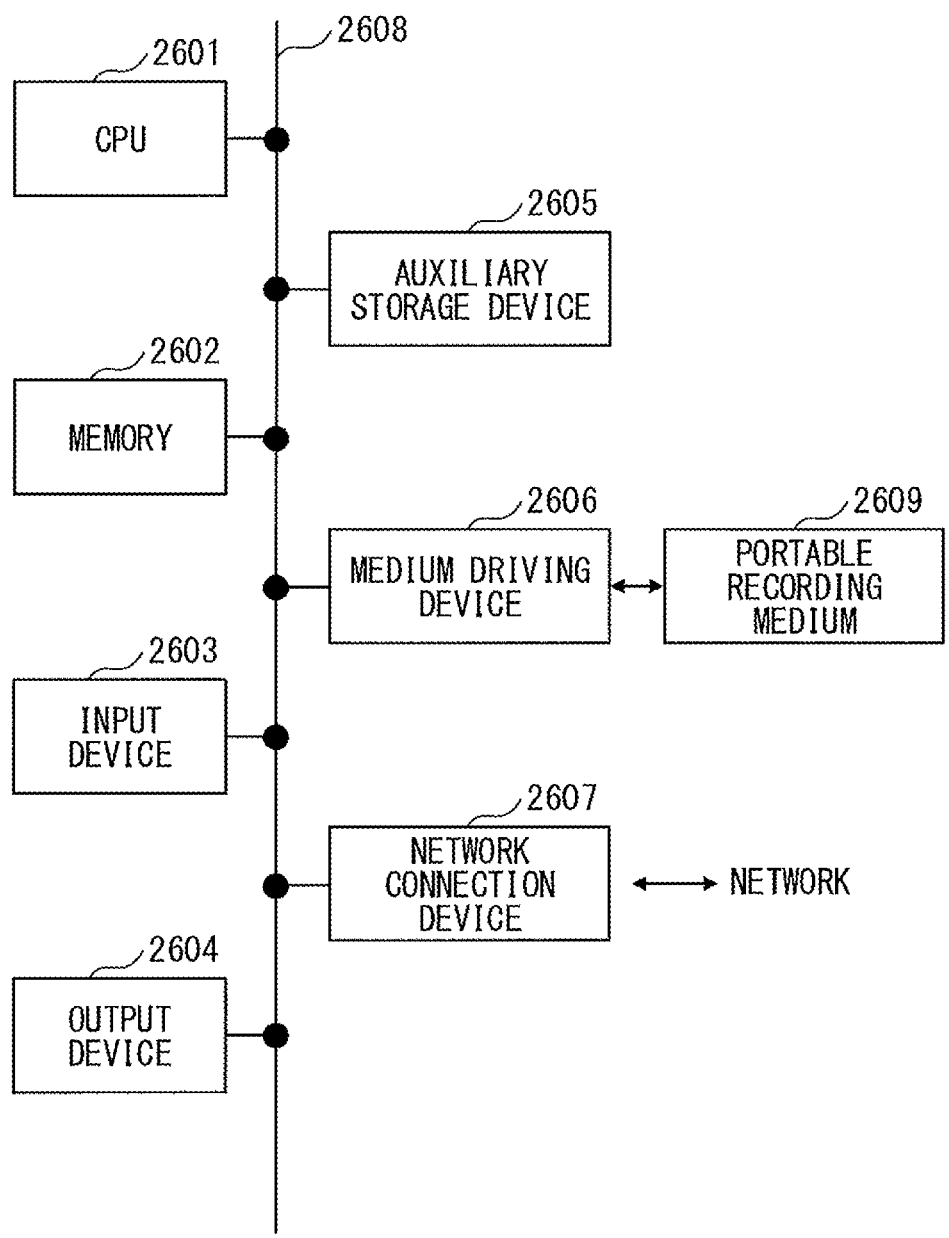
FIG. 26 illustrates a configuration of an information processing apparatus.

FIG. 26 illustrates a configuration example of an information processing apparatus that implements the image processing device 301 illustrated in FIG. 3, FIG. 5 and FIG. 21. The information processing apparatus illustrated in FIG. 26 includes a Central Processing Unit (CPU) 2601, a memory 2602, an input device 2603, an output device 2604, an auxiliary storage unit 2605, a medium driving device 2606 and a network connection device 2607. These constituents are connected to each other via a bus 2608. The photography unit 501 illustrated in FIG. 5 and FIG. 21 may be connected to the bus 2608.

The memory 2602 is for example a semiconductor memory such as a Read Only Memory (ROM), a Random Access Memory (RAM), a flash memory, etc., and stores a program and data used for the image process or the biometric authentication process. The memory 2602 can be used as the storage unit 312 illustrated in FIG. 3, FIG. 5 and FIG. 21.

The CPU 2601 (processor) executes a program by using for example the memory 2602 so as to operate as the shape estimation unit 311, the correction unit 313, the feature extraction unit 502, the matching unit 503 and the leading unit 2101 illustrated in FIG. 3, FIG. 5 and FIG. 21.

The input device 2603 is for example a keyboard, a pointing device, etc., and is used for inputting instructions or information from the operator or the user. The output device 2604 is for example a display device, a printer, a speaker, etc., and is used for outputting inquiries or instructions to the operator or the user and for outputting process results. A process result may be the corrected image 514 and may also be a result of a biometric authentication process.

The auxiliary storage unit 2605 is for example a magnetic disk device, an optical disk device, a magneto-optical disk device, a tape device, etc. The auxiliary storage unit 2605 may be a hard disk drive or a flash memory. The information processing apparatus can store a program and data in the auxiliary storage unit 2605 beforehand so as to load them onto the memory 2602 and use them. The auxiliary storage unit 2605 may be used as the storage unit 312 illustrated in FIG. 3, FIG. 5 and FIG. 21.

The medium driving device 2606 drives a portable recording medium 2609 so as to access information stored in it. The portable recording medium 2609 is a memory device, a flexible disk, an optical disk, a magneto-optical disk, etc. The portable recording medium 2609 may be a Compact Disk Read Only Memory (CD-ROM), a Digital Versatile Disk (DVD), a Universal Serial Bus (USB) memory, etc. The operator or the user can store a program and data in the portable recording medium 2609 so as to load them onto the memory 2602 and use them.

As described above, a computer-readable recording medium that stores a program and data used for the image process or the biometric authentication process is a physical (non-transitory) recording medium such as the memory 2602, the auxiliary storage unit 2605 or the portable recording medium 2609.

The network connection device 2607 is a communication interface that is connected to a communication network such as a Local Area Network, a Wide Area Network, etc. so as to perform the conversion of data used for communications. The information processing apparatus can receive a program and data from an external device via the network connection device 2607 so as to load them onto the memory 2602 and use them.

The information processing apparatus can receive a process request from the user terminal so as to perform the image process or the biometric authentication process and transmit the process results to the user terminal.

Note that it is not necessary for the information processing apparatus to include all the constituents illustrated in FIG. 26, and some of the constituents can be omitted or changed in accordance with the purposes or conditions. For example, when the information processing apparatus receives a process request from the user terminal via a communication network, the input device 2603 and the output device 2604 can be omitted. Also, when the portable recording medium 2609 or a communication network is not used, the medium driving device 2606 or the network connection device 2607 can be omitted.

When the information processing apparatus is a mobile terminal having the telephone function such as a smartphone, the information processing apparatus may include a device for implementing the telephone function such as a microphone or a speaker, and may also include an image pickup device such as a camera.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing device comprising:
    a processor configured to estimate a three-dimensional shape of a subject on the basis of an image of the subject; and
    a memory configured to store the three-dimensional shape of the subject, wherein
    the processor generates a quadratic surface connecting a plurality of points on the subject on the basis of the three-dimensional shape of the subject, develops, on the basis of the quadratic surface, each of the plurality of points to a planar surface contacting the quadratic surface, and calculates a pixel value of a corrected image on the basis of a position of each of the plurality of points developed to the planar surface and by using a plurality of pixel values of the image of the subject.

2. The image processing device according to claim 1, wherein
    the processor estimates the three-dimensional shape of the subject on the basis of a brightness distribution of the image of the subject.

3. The image processing device according to claim 1, wherein
    the processor develops the plurality of points to the planar surface on the basis of a distance between a reference point on the quadratic surface and each of the plurality of points.

4. The image processing device according to claim 3, wherein
    the reference point is a tangent point between the quadratic surface and the planar surface, and the processor develops the plurality of points to the planar surface so that the distance between the reference point and each of the plurality of points and a distance between the reference point and each of the plurality of points developed to the planar surface are identical.

5. The image processing device according to claim 1, wherein
    the processor corrects a pixel value of each of the plurality of points developed to the planar surface, on the basis of a distance between an image pickup element unit that picked up the image of the subject and the quadratic surface and a distance between the image pickup element unit and the planar surface.

6. The image processing device according to claim 1, wherein
    the subject is a palm, and the processor leads the palm to be opened, on the basis of a curvature of the quadratic surface.

7. A non-transitory computer-readable recording medium having stored therein an image processing program causing a computer to execute a process comprising:
    estimating a three-dimensional shape of a subject on the basis of an image of the subject;
    generating a quadratic surface that connects a plurality of points on the subject on the basis of the three-dimensional shape of the subject;
    developing, on the basis of the quadratic surface, each of the plurality of points to a planar surface contacting the quadratic surface; and
    calculating a pixel value of a corrected image on the basis of a position of each of the plurality of points developed to the planar surface and by using a plurality of pixel values of the image of the subject.

8. The non-transitory computer-readable recording medium according to claim 7, wherein
    the estimating the three-dimensional shape of the subject estimates the three-dimensional shape of the subject on the basis of a brightness distribution of the image of the subject.

9. The non-transitory computer-readable recording medium according to claim 7, wherein
    the developing each of the plurality of points develops the plurality of points to the planar surface on the basis of a distance between a reference point on the quadratic surface and each of the plurality of points.

10. The non-transitory computer-readable recording medium according to claim 7, wherein
    the calculating the pixel value of the corrected image corrects a pixel value of each of the plurality of points developed to the planar surface, on the basis of a distance between an image pickup element unit that picked up the image of the subject and the quadratic surface and a distance between the image pickup element unit and the planar surface.

11. An image processing method comprising:
    photographing a subject;
    estimating a three-dimensional shape of a subject on the basis of an image of the subject;
    generating, by using a processor, a quadratic surface that connects a plurality of points on the subject on the basis of the three-dimensional shape of the subject;
    developing, by using the processor and on the basis of the quadratic surface, each of the plurality of points to a planar surface contacting the quadratic surface; and
    calculating, by using the processor, a pixel value of a corrected image on the basis of a position of each of the plurality of points developed to the planar surface and by using a plurality of pixel values of the image of the subject.

12. The image processing method according to claim 11, wherein
the estimating the three-dimensional shape of the subject estimates the three-dimensional shape of the subject on the basis of a brightness distribution of the image of the subject.

13. The image processing method according to claim 11, wherein
the developing each of the plurality of points develops the plurality of points to the planar surface on the basis of a distance between a reference point on the quadratic surface and each of the plurality of points.

14. The image processing method according to claim 11, wherein
the calculating the pixel value of the corrected image corrects a pixel value of each of the plurality of points developed to the planar surface, on the basis of a distance between an image pickup element unit that picked up the image of the subject and the quadratic surface and a distance between the image pickup element unit and the planar surface.

* * * * *